United States Patent
Yoshino et al.

(10) Patent No.: US 8,393,699 B2
(45) Date of Patent: Mar. 12, 2013

(54) CAPACITIVE LOAD DRIVING CIRCUIT, LIQUID EJECTION DEVICE, AND PRINTING APPARATUS

(75) Inventors: Hiroyuki Yoshino, Matsumoto (JP); Atsushi Oshima, Shiojiri (JP); Shinichi Miyazaki, Suwa (JP); Kunio Tabata, Shiojiri (JP); Noritaka Ide, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 294 days.

(21) Appl. No.: 12/843,140

(22) Filed: Jul. 26, 2010

(65) Prior Publication Data
US 2011/0018355 A1    Jan. 27, 2011

(30) Foreign Application Priority Data
Jul. 27, 2009 (JP) .................. 2009-173991

(51) Int. Cl.
*B41J 29/38* (2006.01)
*B41J 2/015* (2006.01)
(52) U.S. Cl. ................... 347/9; 347/10; 347/11; 347/20
(58) Field of Classification Search .............. 347/9–11, 347/20
See application file for complete search history.

(56) References Cited

U.S. PATENT DOCUMENTS
| | | | | |
|---|---|---|---|---|
| 5,134,428 | A * | 7/1992 | Kline et al. | 347/162 |
| 2006/0098036 | A1 * | 5/2006 | Gardner | 347/10 |
| 2010/0238210 | A1 | 9/2010 | Oshima et al. | |

FOREIGN PATENT DOCUMENTS
| | | |
|---|---|---|
| JP | 07-130484 | 5/1995 |
| JP | 2010-221457 A | 10/2010 |
| JP | 2010-221693 A | 10/2010 |

* cited by examiner

*Primary Examiner* — Jason Uhlenhake
(74) *Attorney, Agent, or Firm* — Maschoff Gilmore & Israelsen

(57) ABSTRACT

A capacitive load driving circuit that drives an electrical load having a capacitive component, includes: a first power supply generating a first voltage; a second power supply generating a second voltage different from the first voltage; a plurality of charge storage elements charged by the first power supply; a first connection unit that connects the plurality of charge storage elements to the electrical load by switching connections among the charge storage elements; and a second connection unit that connects the second power supply to the electrical load.

8 Claims, 16 Drawing Sheets

CAPACITIVE LOAD DRIVING CIRCUIT, LIQUID EJECTION DEVICE, AND PRINTING APPARATUS

CROSS-REFERENCE

This application claims priority to Japanese Patent Application No. 2009-173991, filed on Jul. 27, 2009, the entirety of which is hereby incorporated by reference.

BACKGROUND

1. Technical Field

The present invention relates to a technique of driving an electrical load having a capacitive component.

2. Related Art

JP-A-7-130484 discloses a technique in which a plurality of capacitors connected in parallel are charged by using a power supply and the connection of the capacitors is switched from a parallel connection state to a series connection state as needed to generate a voltage higher than a voltage of the power supply, thereby driving an electrical load. By using the proposed technique, a voltage many times higher than a voltage generated by the power supply can be applied to the electrical load according to the number of capacitors connected in series.

A voltage waveform generated in this manner is a waveform whose voltage changes stepwise every time the number of capacitors connected in series increases or decreases. When a voltage generated by a capacitor is decreased and the number of capacitors is increased in proportion to the reduction in voltage, a highly accurate voltage waveform whose voltage change is small can be generated.

In the proposed technique, however, when it is intended to generate a highly accurate voltage waveform, there is a problem that the size of a circuit for generating a voltage waveform increases. For generating a highly accurate voltage waveform, it is necessary to generate a voltage waveform by decreasing a voltage generated by a capacitor and by using more capacitors. However, since a capacitor is relatively large, an increase in the number of capacitors increases the size of the circuit. Further for capacitors, a switch for connecting the capacitor to a power supply to charge the capacitor or a switch for connecting the capacitors in series is required. Therefore, when the number of capacitors increases, also the number of switches increases, resulting in a further increase in size of the circuit. Moreover, when the number of switches increases, the electrical resistance of the circuit increases, resulting in an increase in power loss or a reduction in response of the circuit. Therefore, it becomes impossible to follow a rapid change in voltage, which may make it hard to output a highly accurate voltage waveform.

SUMMARY

An advantage of some aspects of the invention is to provide a technique capable of outputting a highly accurate voltage waveform to drive a capacitive load without increasing the size of a circuit.

To achieve the advantage, the invention employs the following configuration.

An aspect of the invention is directed to a capacitive load driving circuit that drives an electrical load having a capacitive component, including: a first power supply generating a first voltage; a second power supply generating a second voltage different from the first voltage; a plurality of charge storage elements charged by the first power supply; a first connection unit that connects one of the charge storage elements or two or more of the charge storage elements connected in series to the electrical load by changing the connection state among the plurality of charge storage elements; and a second connection unit that connects the second power supply alone, or with the charge storage element connected in series thereto, to the electrical load.

In the capacitive load driving circuit according to the aspect of the invention, after the charge storage elements are charged by the first power supply, the connection state among the charge storage elements is changed to connect at least one of the charge storage elements, or two or more of the charge storage elements connected in series, to the electrical load. The second power supply generating a second voltage different from that of the first power supply is also disposed, and the second power supply can be connected alone, or with the charge storage element connected in series thereto, to the electrical load.

Since the charge storage elements are charged by the first power supply generating the first voltage, when one of the charge storage elements is connected to the electrical load, the first voltage can be applied to the electrical load. When two or more of the charge storage elements are connected in series to be connected to the electrical load, a voltage according to the number of charge storage elements can be applied to the electrical load. In a state where a charge storage element is connected to the electrical load, when the second power supply is connected in series to the charge storage element, a voltage obtained by adding up a voltage of the charge storage element and a voltage of the second power supply can be applied to the electrical load. When two or more of the charge storage elements are connected in series, a voltage obtained by adding up a total voltage of the two or more charge storage elements and a voltage of the second power supply can be applied to the electrical load. That is, in a state where one of or two or more of the charge storage elements are connected to the electrical load, when the second power supply is connected in series to the charge storage element(s), or the connection is released, a voltage to be applied to the electrical load can be changed. In the capacitive load driving circuit according to the aspect of the invention in this manner, the increase or decrease in voltage to be applied to the electrical load can be set finely without increasing the number of charge storage elements. As a result, it is possible to apply a highly accurate voltage waveform without increasing the size of the circuit.

The second voltage generated by the second power supply can be set higher than the first voltage generated by the first power supply. With this setting, a voltage range that can be applied to the electrical load can be wider than when the second voltage is set lower than the first voltage, which is preferable. Especially when the second voltage is set higher than a voltage generated when all the charge storage elements are connected in series (that is, a voltage obtained by multiplying the first voltage by the number of charge storage elements), an applicable voltage range can be much wider. Further, an applied voltage range with the connection of the second power supply and an applied voltage range without the connection of the second power supply can be separately set. Therefore, when a voltage to be applied to the electrical load is changed, the connection state of the charge storage elements or the second power supply can be switched with a simple operation, which is preferable.

In the capacitive load driving circuit according to the aspect of the invention, an auxiliary charge storage element that is a charge storage element charged by the second power supply is included, and a current limiting unit that limits current flowing from the second power supply toward the auxiliary charge storage element may be disposed between the second power supply and the auxiliary charge storage element.

With this configuration, when charge is discharged from the electrical load, the charge can be recovered by the auxiliary charge storage element in addition to the charge storage elements. When the next applied voltage is increased, an applied voltage can be increased with the charge recovered by the auxiliary charge storage element. Therefore, the electrical load can be driven more efficiently. By connecting the auxiliary charge storage element to the second power supply via the current limiting unit, charge is not supplied from the second power supply when charge is supplied from the auxiliary charge storage element to the electrical load. When charge is replenished from the second power supply to the auxiliary charge storage element, the auxiliary charge storage element excessively stores charge when charge is discharged from the electrical load. However, this can be avoided by using the current limiting unit.

As the auxiliary charge storage element, a resistance, a switch, a diode, or the like may be used. For example, when a resistance is used as the auxiliary charge storage element, the rate of supply of charge from the second power supply to the auxiliary charge storage element can be reduced. Accordingly, in the case of increasing an applied voltage, even when the charge of the auxiliary charge storage element decreases as a result of supplying the charge from the auxiliary charge storage element to the electrical load, charge is not immediately replenished from the second power supply. When a switch is used as the auxiliary charge storage element, the replenishment of charge from the second power supply to the auxiliary charge storage element can be stopped by bringing the switch into a disconnected state. Accordingly, in the case of increasing an applied voltage, even when the charge of the auxiliary charge storage element decreases because of the supply of charge from the auxiliary charge storage element to the electrical load, the replenishment of charge from the second power supply can be stopped as needed. In the case of using a diode as the auxiliary charge storage element, charge can be replenished from the second power supply only when the charge of the auxiliary charge storage element decreases, and the voltage difference between the second power supply and the auxiliary charge storage element is a predetermined voltage or more. For the above reason, even when the charge discharged from the electrical load at the time of decreasing an applied voltage is recovered by the auxiliary charge storage element, the auxiliary charge storage element does not excessively store charge.

In the capacitive load driving circuit according to the aspect of the invention, when the magnitude of a capacitive component of the electrical load varies, at least one of the first voltage generated by the first power supply and the second voltage generated by the second power supply may vary according to the magnitude of a capacitive component of the electrical load.

When the magnitude of a capacitive component of the electrical load greatly fluctuates, the amount of charge to be supplied to the electrical load for increasing an applied voltage by a certain voltage also greatly fluctuates. As a result, the supply of charge cannot keep up with the fluctuation, which may make it impossible to increase an applied voltage to a target voltage. Also in this case, however, at least one of the first voltage generated by the first power supply and the second voltage generated by the second power supply is changed to a slightly higher level, whereby the supply of charge to the electrical load can be facilitated. Therefore, an applied voltage can be increased to a target voltage.

In the capacitive load driving circuit according to the aspect of the invention, charge may be discharged from a charge storage element that stores a predetermined voltage higher than the first voltage, among the plurality of charge storage elements.

By doing this, it is possible to reduce the influence of an increase in voltage of the charge storage element on a voltage to be applied to the electrical load. In the case of discharging charge from the charge storage element, the voltages of the charge storage elements are monitored. Therefore, if the voltage of any of the charge storage elements exceeds a predetermined voltage, charge can be discharged from the relevant charge storage element. Alternatively, based on a voltage waveform to be applied to the electrical load, a charge storage element whose voltage value exceeds a predetermined voltage is predicted, and charge may be discharged from the charge storage element. A charge discharging unit may be disposed for all the charge storage elements. Alternatively, the charge discharging unit may be disposed only for a charge storage element whose voltage is likely to increase in view of the relation of a voltage waveform intended to be applied. Charge may be discharged to those other than the electrical load. Charge may be discharged to ground or may be discharged to another charge storage element having insufficient charge. In addition, the charge discharging unit may be configured of a switch that can switch between a conductive state and a disconnected state, and a controller (for example, a computer) that controls the operation of the switch. Alternatively, a semiconductor element that is automatically brought into the conductive state when a voltage across the terminals exceeds a certain voltage, like a zener diode for example, may be used.

In the capacitive load driving circuit according to the aspect of the invention where a capacitive component of the electrical load varies, a time for discharging charge from the charge storage element may be changed according to the magnitude of a capacitive component of the electrical load.

Charge recovered from the electrical load to the charge storage element increases as a capacitive component of the electrical load increases. Accordingly, when charge is discharged from the charge storage element, the amount of charge to be discharged increases and a time required for discharging also increases, as a capacitive component of the electrical load increases. When the time for discharging charge from the charge storage element is changed according to the magnitude of a capacitive component of the electrical load, over discharging or insufficient discharging does not occur. As a result, it is possible to maintain the voltage of the charge storage element in a proper voltage range and apply a highly accurate voltage waveform to the electrical load.

A liquid ejection device that ejects liquid from an ejection nozzle by using a drive element having a capacitive component, such as a piezo element, or a printing apparatus that ejects ink to print an image have been known. In the liquid ejection device or the printing apparatus, since the miniaturization of the device or the apparatus and an improvement in ejection accuracy of liquid or ink are demanded, the capacitive load driving circuit according to the aspect of the invention can be suitably applied.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment will be described for making clear the contents of the invention in the following order.
A. Device Configuration
B. Peripheral Circuit Configuration of Ejection Head Driving Circuit
  B-1. Configuration of Ejection Head Driving Circuit
  B-2. Method for Generating Drive Waveform
C. Modified Examples
  C-1. First Modified Example
  C-2. Second Modified Example
  C-3. Third Modified Example
  C-4. Fourth Modified Example

A. DEVICE CONFIGURATION

Figure 1:
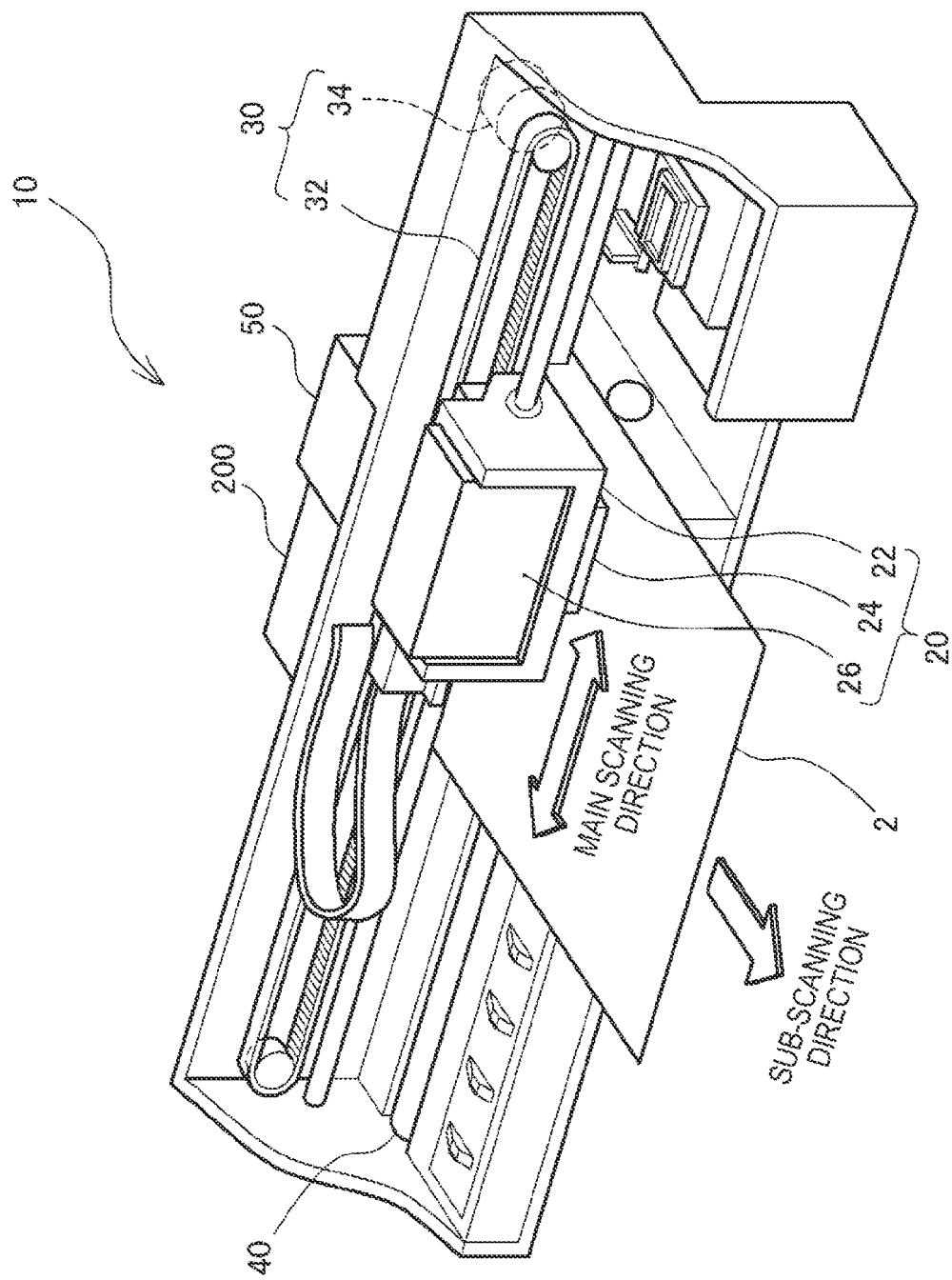
FIG. 1 is an explanatory view exemplifying an inkjet printer on which an ejection head driving circuit as a capacitive load driving circuit of an embodiment is mounted.

FIG. 1 is an explanatory view exemplifying an inkjet printer 10 on which an ejection head driving circuit as a capacitive load driving circuit of the embodiment is mounted. The illustrated inkjet printer 10 includes a carriage 20, a drive mechanism 30, and a platen roller 40. The carriage 20 reciprocates in a main scanning direction to form an ink dot on a print medium 2. The drive mechanism 30 makes the carriage 20 reciprocate. The platen roller 40 feeds the print medium 2. The carriage 20 is provided with an ink cartridge 26 accommodating ink therein, a carriage case 22 into which the ink cartridge 26 is loaded, an ejection head 24 that is mounted on the bottom side (side facing the print medium 2) of the carriage case 22 to eject ink, and the like. Therefore, the carriage 20 can guide the ink in the ink cartridge 26 to the ejection head 24 and eject ink from the ejection head 24 to the print medium 2.

The drive mechanism 30 that makes the carriage 20 reciprocate includes a timing belt 32 that is stretched by a pulley and a step motor 34 that drives the timing belt 32 via the pulley. A part of the timing belt 32 is fixed to the carriage case 22 so that it is possible to make the carriage case 22 reciprocate by driving the timing belt 32. The platen roller 40, a not-shown drive motor, and a gear mechanism constitute a paper feeding mechanism for feeding the print medium 2, whereby the print medium 2 can be fed in a sub-scanning direction at a predetermined amount.

The inkjet printer 10 also has a printer control circuit 50 that controls the entire operation and an ejection head driving circuit 200 for driving the ejection head 24 mounted thereon. The ejection head driving circuit 200, the drive mechanism 30, the paper feeding mechanism, and the like drive the ejection head 24 to eject ink while feeding the print medium 2 under the control of the printer control circuit 50, thereby printing an image on the print medium 2.

B. PERIPHERAL CIRCUIT CONFIGURATION OF EJECTION HEAD DRIVING CIRCUIT

Figure 2:
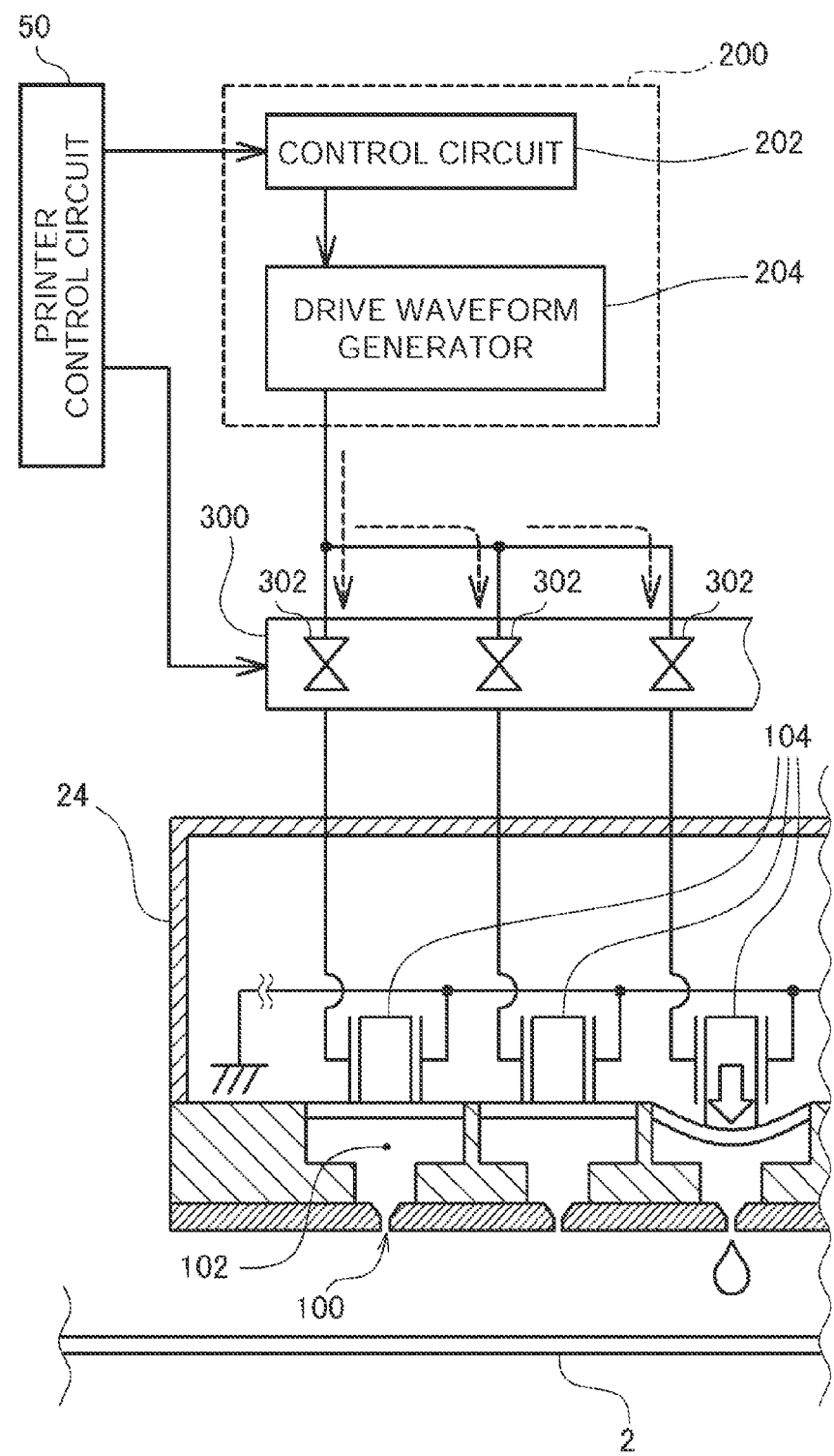
FIG. 2 is an explanatory view showing the peripheral circuit configuration of the ejection head driving circuit.

FIG. 2 is an explanatory view showing the peripheral circuit configuration of the ejection head driving circuit 200 that drives the ejection head 24. As shown in the drawing, at the periphery of the ejection head driving circuit 200, the printer control circuit 50, a gate unit 300, and the like are provided. The ejection head driving circuit 200 is connected to the ejection head 24 via the gate unit 300. Before describing these circuit configurations, the inner structure of the ejection head 24 will be briefly described.

As shown on the lower side of FIG. 2, on the bottom surface (surface facing the print medium 2) of the ejection head 24, a plurality of ejection nozzles 100 that eject ink drops are disposed. Each of the ejection nozzles 100 is connected to an ink chamber 102 in which ink supplied from the ink cartridge 26 is filled. A piezo element 104 is disposed on the upper surface of the ink chamber 102. When voltage is applied to the piezo element 104, the piezo element is deformed to pressurize the ink chamber 102, whereby an ink drop is ejected from the ejection nozzle 100. Since the deformation amount of the piezo element 104 varies depending on an applied voltage, when the deformation amount or timing of the ink chamber 102 is controlled by applying a proper voltage waveform to the piezo element 104, an ink drop having a proper size can be ejected at a proper timing.

The ejection head driving circuit 200 generates a voltage waveform (drive waveform) to be applied to the piezo element 104 under the control of the printer control circuit 50. The generated drive waveform is supplied to the piezo element 104 via the gate unit 300. The gate unit 300 is a circuit unit in which the plurality of gate elements 302 are connected in parallel. The gate elements 302 can be electrically conducted or disconnected individually under the control of the printer control circuit 50. Accordingly, when the gate element 302 is electrically conducted or disconnected previously by the printer control circuit 50, and thereafter a drive waveform is output from the ejection head driving circuit 200, the drive waveform passes through only the gate element 302 that is electrically conducted and is applied to the corresponding piezo element 104, whereby an ink drop can be ejected from the corresponding nozzle.

As shown in FIG. 2, the ejection head driving circuit 200 of the embodiment includes a control circuit 202 and a drive waveform generator 204. When the printer control circuit 50 commands the ejection head driving circuit 200 to output a drive waveform, the control circuit 202 controls the operation of the drive waveform generator 204 in response to the command, whereby a proper drive waveform is output from the ejection head driving circuit 200.

In this case, a piezo element is a so-called electrical load having a capacitive component (capacitive load) as has been well known. When voltage is applied, charge corresponding to the applied voltage is stored inside the piezo element. The charge amount stored therein increases as the applied voltage increases. When the applied voltage decreases, the charge amount stored therein decreases, whereby the charge is discharged. Therefore, the charge discharged from the piezo element when an applied voltage decreases is stored in a plurality of capacitors, and the charge stored in the capacitors is supplied to the piezo element when an applied voltage is next increased, whereby the piezo element can be efficiently driven with less power.

A drive waveform generated in this manner is a waveform whose voltage changes stepwise. When the charge discharged from the piezo element is distributed to store the charge in many capacitors, the step of the voltage changing stepwise can be made small. However, when the number of capacitors increases, the size of the ejection head driving circuit 200 increases. Moreover, when the number of capacitors increases, the number of switches for switching the connection between capacitors also increases, leading to an increase in circuit resistance. As a result, power loss occurs, or the response of the circuit decreases. As a result, it becomes impossible to follow a rapid change in voltage, which may make it hard to output a highly accurate voltage waveform. In the ejection head driving circuit 200 of the embodiment, therefore, the following circuit configuration is employed for enabling output of a highly accurate drive waveform whose voltage step is small with a small circuit.

B-1. Configuration of Ejection Head Driving Circuit

Figure 3:
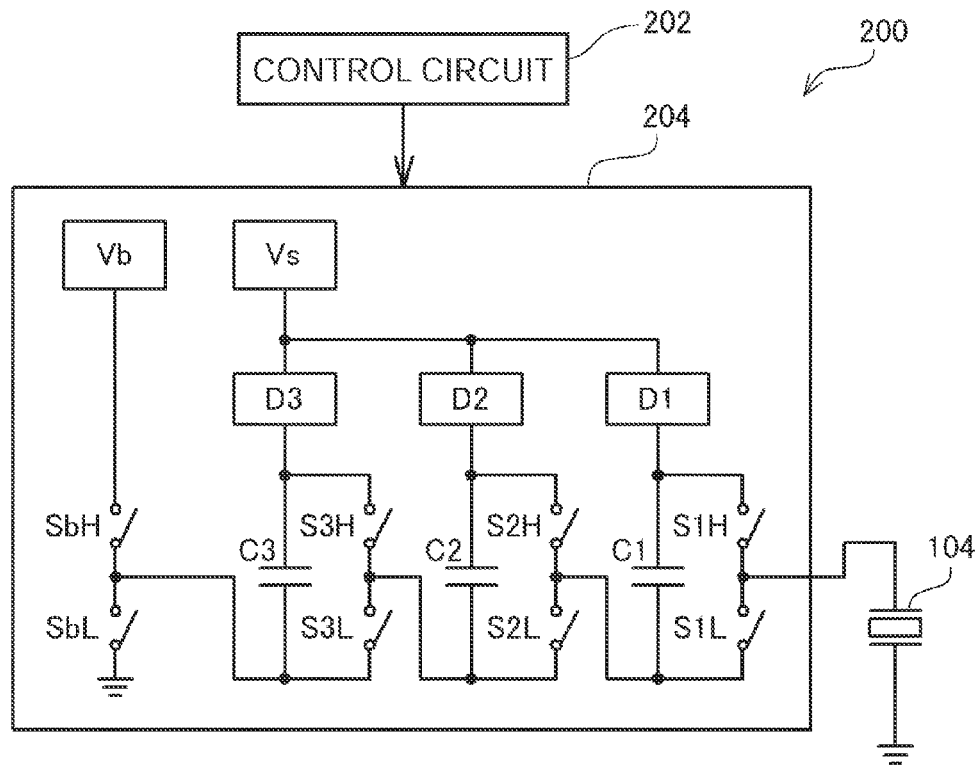
FIG. 3 is an explanatory view showing the detailed configuration of the ejection head driving circuit of the embodiment.

FIG. 3 is an explanatory view showing the detailed configuration of the ejection head driving circuit 200 of the embodiment. As shown in the drawing, the ejection head driving circuit 200 includes the control circuit 202 and the drive waveform generator 204. The drive waveform generator 204 includes a plurality of capacitors, a power supply unit that charges the capacitors, and a plurality of switches. The control circuit 202 controls the connection of the switches. In the example shown in FIG. 3, although three capacitors of capacitors C1 to C3 are used, more capacitors may be used. Moreover, although the piezo element 104 in the ejection head 24 of the inkjet printer 10 is shown as an electrical load to be driven, any electrical load (for example, display devices such as liquid crystal display devices) is applicable without limiting to the piezo element 104 as long as it is an electrical load having a capacitive component (capacitive load).

The drive waveform generator 204 includes a first power supply Vs and a second power supply Vb. The three capacitors C1 to C3 are connected in parallel to the first power supply Vs. Diodes D1 to D3 that prevent the back flow of current in a direction from the capacitor to the first power supply Vs are respectively inserted between the capacitors C1 to C3 and the first power supply Vs. In this case, although the diodes D1 to D3 are inserted between the capacitors and the first power supply Vs for preventing the back flow from the capacitors C1 to C3 to the first power supply Vs, switches may be inserted instead of the diodes D1 to D3.

For each of the capacitors C1 to C3, a set of switches connected in series are connected in parallel with respect to the capacitor. For example, for the capacitor C1, a set of switches having two switches S1H and S1L connected in series are connected in parallel with respect to the capacitor C1. The set of switches are connected on the switch S1H side to a terminal of the capacitor C1 on the high potential side (terminal on the side connected to the first power supply Vs) and connected on the switch S1L side to a terminal of the capacitor C1 on the low potential side (terminal on the side not connected to the first power supply Vs). The same applies to the capacitor C2 and the capacitor C3. That is, a set of switches having a switch S2H and a switch S2L connected in series are connected in parallel to the capacitor C2, and a set of switches having a switch S3H and a switch S3L connected in series are connected in parallel to the capacitor C3. Hereinafter, the set of switches (set of the switch S1H and the switch S1L) connected in parallel to the capacitor C1 are also referred to as "set of switches S1". Similarly, the set of switches (set of the switch S2H and the switch S2L) connected in parallel to the capacitor C2 are also referred to as "set of switches S2", and the set of switches (set of the switch S3H and the switch S3L) connected in parallel to the capacitor C3 are also referred to as "set of switches S3".

While no capacitor is connected to the second power supply Vb, a set of switches having a switch SbH and a switch SbL connected in series are connected thereto. Hereinafter, the set of switches are also referred to as "set of switches Sb". In the set of switches Sb, the switch SbH is connected to an output terminal of the second power supply Vb, and the switch SbL is earthed to ground.

Between the switch SbH and the switch SbL constituting the set of switches Sb, a terminal of the next capacitor C3 on the low potential side (terminal on the side not connected to the first power supply Vs) is connected. As described above, the set of switches S3 are connected in parallel to the capacitor C3. Therefore, the fact that the terminal of the capacitor C3 on the low potential side is connected between the switch SbH and the switch SbL constituting the set of switches Sb means that the set of switches S3 are connected on the switch S3L side between the two switches SbH and SbL of the set of switches Sb.

Also for the set of switches S3 connected in parallel to the capacitor C3 and the capacitor C2 (accordingly, the set of switches S2 connected in parallel to the capacitor C2), a terminal of the capacitor C2 on the low potential side (accordingly, the switch S2L of the set of switches S2) is connected between the switch S3H and the switch S3L constituting the set of switches S3 in the same manner as the set of switches Sb and the capacitor C3 (and the set of switches S3) described above. The set of switches S2 connected in parallel to the capacitor C2 and the capacitor C1 (accordingly, the set of switches S1 connected in parallel to the capacitor C1) are also in the same relation. A terminal of the capacitor C1 on the low potential side (accordingly, the switch S1L of the set of switches S1) is connected between the switch S2H and the switch S2L constituting the set of switches S2. Between the switch S1H and the switch S1L constituting the set of switches S1 connected in parallel to the capacitor C1, the piezo element 104 is connected via the gate unit 300. In FIG. 3, the gate unit 300 is not illustrated.

The thus configured drive waveform generator 204 of the embodiment causes electrical conduction or disconnection among the switches S1H to S3H, the switches S1L to S3L, the switch SbH, and the switch SbL under the control of the control circuit 202, thereby generating a drive waveform for the piezo element 104. A method for generating a drive waveform by changing the connection of the switches will be described below.

B-2. Method for Generating Drive Waveform

For driving a load by using the drive waveform generator 204 of the embodiment, the capacitors C1 to C3 have to be previously charged. Therefore, the capacitors C1 to C3 are connected to the first power supply Vs by connecting the switches S1H to S3H, S1L to S3L, SbH, and SbL as follows.

Figure 4:
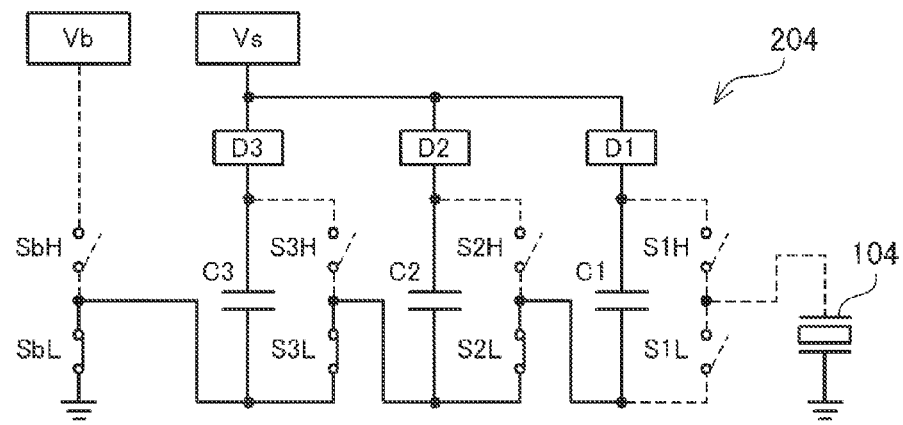
FIG. 4 is an explanatory view showing the connection state of switches for charging capacitors.

FIG. 4 is an explanatory view showing the connection state of the switches for charging the capacitors C1 to C3 by connecting to the first power supply Vs. As shown in the drawing, for charging the capacitors C1 to C3, the switch SbL, the switch S3L, and the switch S2L are electrically conducted (ON), and all the other switches are disconnected (OFF). When the connection of the switches is observed by focusing on the capacitor C3, the terminal of the capacitor C3 on the low potential side is connected to ground because the switch SbL is ON. On the other hand, the terminal of the capacitor C3 on the high potential side is connected to the first power supply Vs via the diode D3 for preventing back flow. In the end, a voltage (voltage Vs) generated by the first power supply Vs is charged to the capacitor C3.

Since the switch S3L is ON, the terminal of the capacitor C2 on the low potential side is connected to the terminal of the capacitor C3 on the low potential side. The terminal of the capacitor C3 on the low potential side is connected to ground as described above. In the end, the terminal of the capacitor C2 on the low potential side is connected to ground, and the terminal of the capacitor C2 on the high potential side is connected to the first power supply Vs via the diode D2. Therefore, the voltage Vs is charged also to the capacitor C2. Similarly, for the capacitor C1, since the switch S2L is ON, the terminal of the capacitor C1 on the low potential side is connected to ground, and the terminal on the high potential side is connected to the first power supply Vs via the diode D1. In the end, the voltage Vs is charged to the capacitor C1. For the convenience of understanding, in FIG. 4, wires that are electrically conducted are indicated by bold solid lines, and wires not electrically conducted are indicated by thin broken lines. Also in FIG. 4, while the switch S1L is OFF, the capacitors C1 to C3 can be charged even when the switch S1L is ON.

After charging the capacitors C1 to C3 with the voltage Vs as described above, the drive waveform generator 204 of the embodiment can apply a voltage according to the connection state to the piezo element 104 by switching the connections of the switches.

Figure 5A:
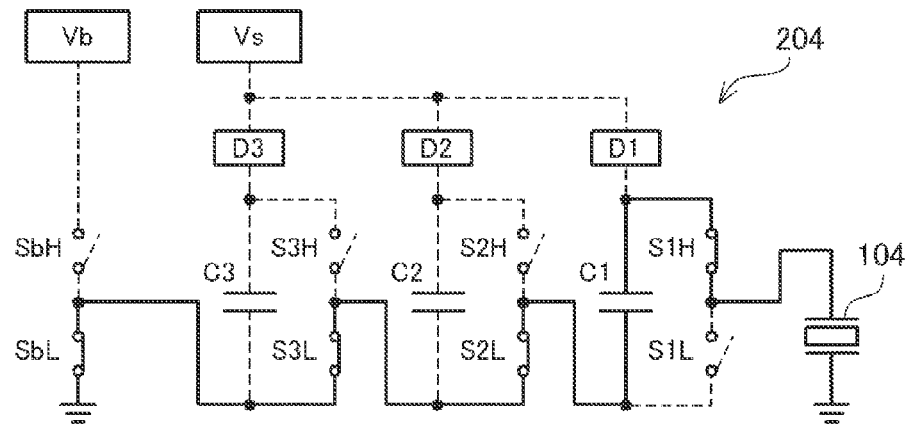
FIGS. 5A to 5C are explanatory views exemplifying a state where a voltage to be applied to a piezo element is changed according to the connection state of the switches.
Figure 5B:
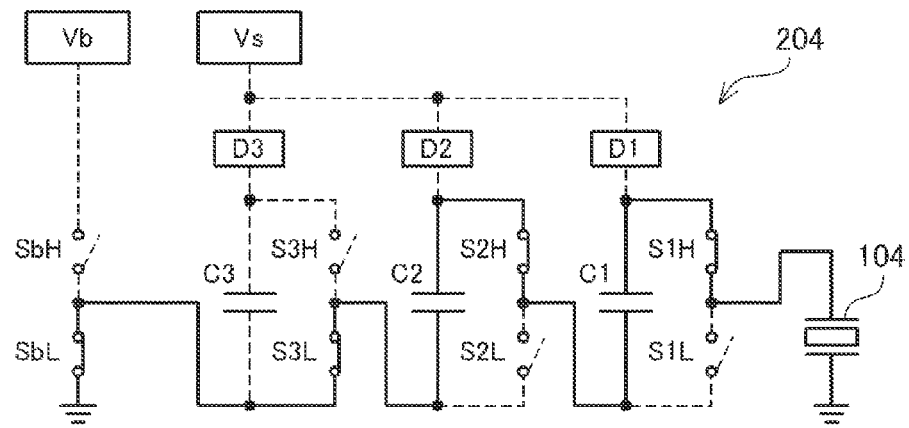
Figure 5C:
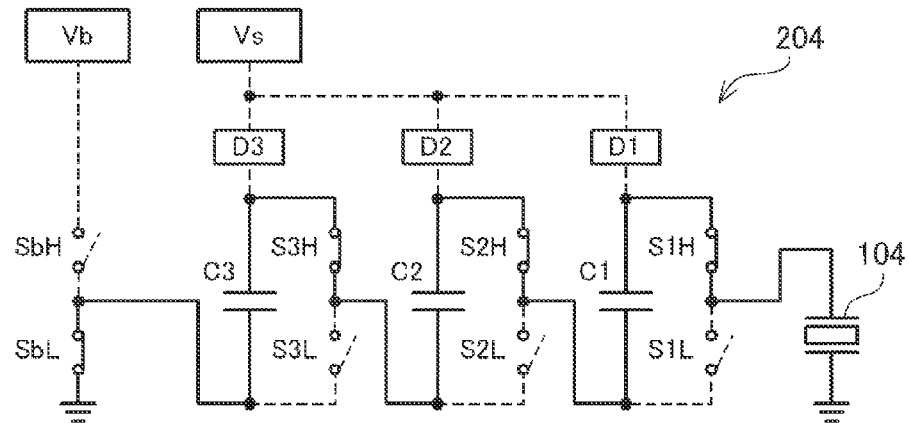

FIGS. 5A to 5C are explanatory views exemplifying a state where a voltage to be applied to the piezo element 104 is changed according to the connection state of the switches. In the example shown in FIG. 5A for example, for the set of switches S1 (the switch S1H and the switch S1L) connected in parallel to the capacitor C1, the switch S1H on the high potential side is set to ON, and the switch S1L on the low potential side is set to OFF. For the other sets of switches S2, S3, and Sb, on the other hand, the switches S2H, S3H, and SbH on the high potential side are set to OFF, and the switches S2L, S3L, and SbL on the low potential side are set to ON. When the connections of the switches are set in this manner, a voltage only of the capacitor C1 can be applied to the piezo element 104. In FIGS. 5A to 5C, a current path for applying a voltage to the piezo element 104 is indicated by a bold solid line. Since the capacitor C1 is charged with the voltage Vs, the voltage Vs is applied to the piezo element 104.

In the example shown in FIG. 5B, on the other hand, for the set of switches S1 connected in parallel to the capacitor C1 and the set of switches S2 connected in parallel to the capacitor C2, the switches on the high potential side (that is, the switch S1H and the switch S2H) are set to ON, and the switches on the low potential side (the switch S1L and the switch S2L) are set to OFF. For the other sets of switches S3 and Sb, the switches on the high potential side (the switch S3H and the switch SbH) are set to OFF, and the switches on the low potential side (the switch S3L and the switch SbL) are set to ON. In the connection state of the switches described above, the capacitor C1 and the capacitor C2 are connected in series, and the total of voltages (voltage 2Vs) generated by the capacitor C1 and the capacitor C2 is applied to the piezo element 104.

As a result of the series connection of the capacitor C1 and the capacitor C2, a voltage of the capacitor C1 on the high potential side is higher than a voltage generated by the first power supply Vs and charged to the capacitor C1. As described above, however, since the diode D1 for preventing back flow is inserted between the capacitor C1 and the first power supply Vs, current does not flow back from the capacitor C1 toward the first power supply Vs.

In the example shown in FIG. 5C, for the sets of switches connected in parallel to the capacitors C1 to C3, the switches on the high potential side (the switches S1H to S3H) are set to ON, and the switches on the low potential side (the switches S1L to S3L) are set to OFF. For the set of switches Sb connected to the second power supply Vb, the switch SbH on the high potential side is set to OFF, and the switch SbL on the low potential side is set to ON. In the connection state of the switches described above, the capacitors C1 to C3 are connected in series, and the total of voltages (voltage 3Vs) generated by the capacitors C1 to C3 is applied to the piezo element 104. As a result of the series connection of the capacitors C1 to C3, a voltage of the capacitor C1 or the capacitor C2 on the high potential side is higher than a voltage generated by the first power supply Vs. However, since the diodes D1 and D2 for preventing back flow are respectively inserted between the capacitors C1 and C2 and the first power supply Vs, current does not flow back to the first power supply Vs.

As will be understood from the above description, the sets of switches connected in parallel to the capacitors C1 to C3 each function so as to connect the capacitor corresponding to the set of switches to the piezo element 104. That is, when a switch on the high potential side of one set of switches is set to ON, and a switch on the low potential side is set to OFF, a capacitor corresponding to the set of switches is connected to the piezo element 104. When a plurality of capacitors are connected to the piezo element 104 (that is, for a plurality of sets of switches, switches on the high potential side are set to ON, and switches on the low potential side are set to OFF), the capacitors are connected to the piezo element 104 while the capacitors remain connected in series. For example, for the set of switches S1 corresponding to the capacitor C1 and the set of switches S3 corresponding to the capacitor C3, when the switches on the high potential side (the switch S1H and the switch S3H) are set to ON, and the switches on the low potential side (the switch S1L and the switch S3L) are set to OFF, the capacitor C1 and the capacitor C3 are connected in series, whereby a voltage obtained by adding up the voltages of the capacitors is applied to the piezo element 104.

Figure 6A:
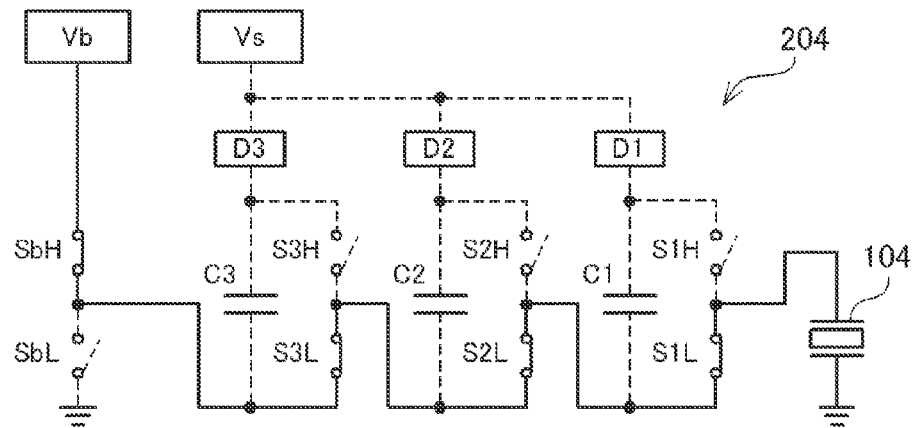
FIGS. 6A to 6C are explanatory views exemplifying a state of connecting a second power supply to the piezo element.
Figure 6B:
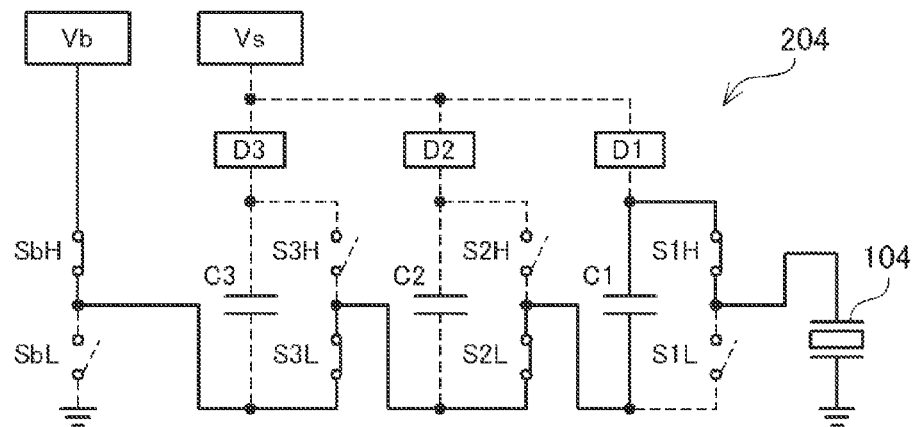
Figure 6C:
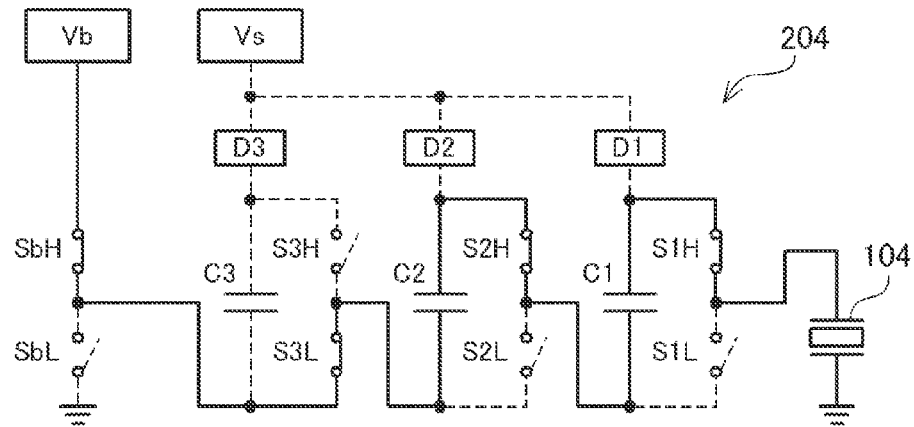

The set of switches Sb connected to the second power supply Vb functions so as to connect the second power supply Vb to the piezo element 104. FIGS. 6A to 6C are explanatory views exemplifying a state of connecting the second power supply Vb to the piezo element 104 by using the set of switches Sb connected to the second power supply Vb. In the example shown in FIG. 6A for example, for the sets of switches S1 to S3 corresponding to the capacitors C1 to C3, the switches S1H to S3H all on the high potential side are set to OFF, and the switches S1L to S3L on the low potential side are set to ON. Accordingly, none of the capacitors C1 to C3 are connected to the piezo element 104. For the set of switches Sb (the switch SbH and the switch SbL) connected to the second power supply Vb, the switch SbH on the high potential side is set to ON, and the switch SbL on the low potential side is set to OFF. Therefore, the second power supply Vb is connected to the piezo element 104. When a voltage generated by the second power supply Vb is defined as a voltage Vb, the voltage Vb is applied to the piezo element 104. Also in FIGS. 6A to 6C, a current path for applying a voltage to the piezo element 104 is indicated by a bold solid line.

As described above, when the second power supply Vb is connected to the piezo element 104, and any of the capacitors C1 to C3 is connected to the piezo element 104, the capacitor and the second power supply Vb are connected in series, whereby the total voltage of them is applied to the piezo element 104. In the example shown in FIG. 6B for example, since the switch S1H on the high potential side of the set of switches corresponding to the capacitor C1 is set to ON, and the switch S1L on the low potential side is set to OFF, also the capacitor C1 is connected to the piezo element 104. Accordingly, the second power supply Vb and the capacitor C1 are connected in series, whereby the total voltage (voltage Vb+Vs) of them is applied to the piezo element 104.

It is also possible to connect the second power supply Vb to the piezo element 104 and to further connect a plurality of capacitors to the piezo element 104. As exemplified in FIG. 6C for example, for the set of switches corresponding to the capacitor C1 and the set of switches corresponding to the capacitor C2, when the switches on the high potential side are set to ON, and the switches on the low potential side are set to OFF, the capacitor C1 and the capacitor C2 are connected to the piezo element 104 in addition to the second power supply Vb. As a result, the second power supply Vb, the capacitor C1, and the capacitor C2 are connected in series, whereby the total voltage (voltage Vb+2Vs) of them is applied to the piezo element 104.

When the second power supply Vb and the capacitor C3 are connected to the piezo element 104, the second power supply Vb and the capacitor C3 are connected in series. As a result, a voltage of the capacitor C3 on the high potential side is higher than a voltage generated by the first power supply Vs. However, since the diode D3 for preventing back flow is inserted between the capacitor C3 and the first power supply Vs, current does not flow back to the first power supply Vs.

As described above, in the drive waveform generator 204 of the embodiment, the connection state of the switches is properly set, whereby an arbitrary capacitor selected from the capacitors C1 to C3 and the second power supply Vb can be connected to generate various voltages. Accordingly, by switching the switches to change a voltage to be applied to the piezo element 104, an arbitrary drive waveform can be generated.

In the above description, the second power supply Vb is connected to the terminals of the capacitors C1 to C3 on the low potential side. As is apparent from the above description, however, it is sufficient for the second power supply Vb to be connected in series to the capacitors C1 to C3, and the second power supply Vb may not necessarily be connected to the terminals on the low potential side.

Figure 7A:
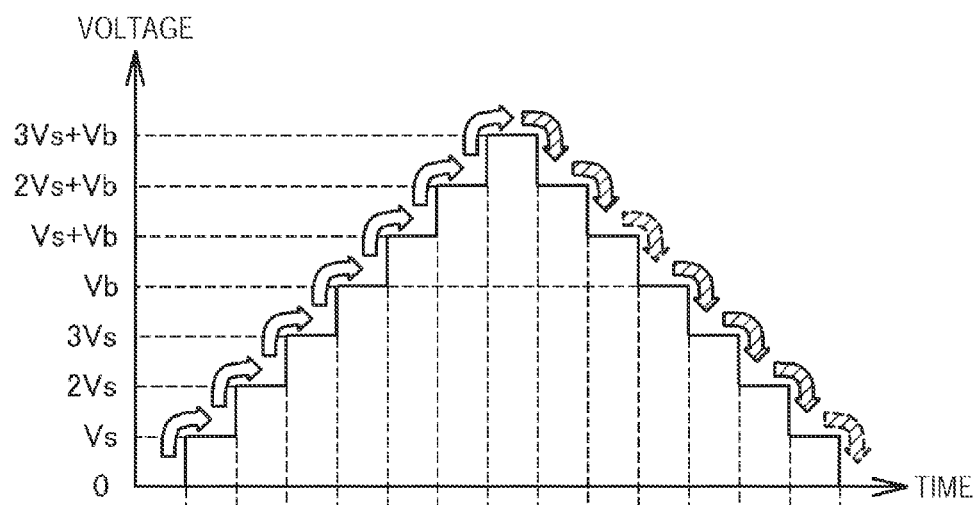
FIGS. 7A and 7B are charts showing a state of generating a mountain-shaped drive waveform by switching the connection states of switches.
Figure 7B:
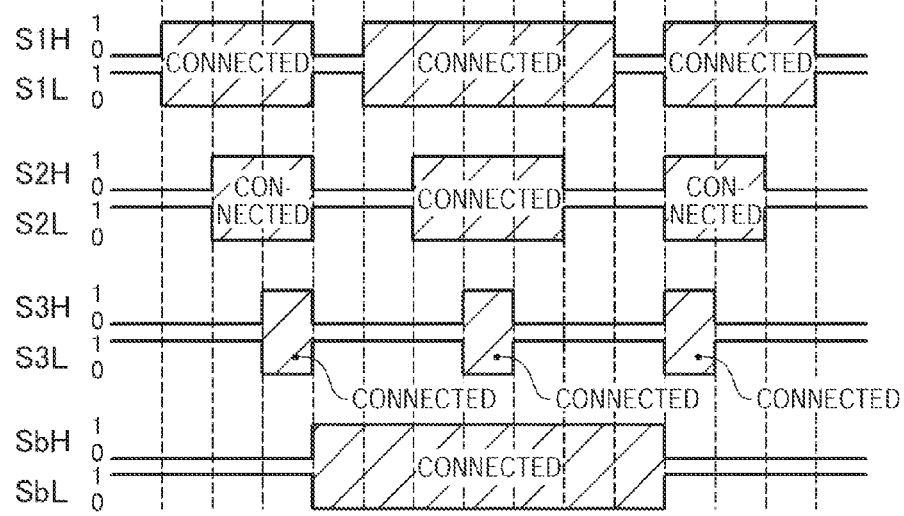

FIGS. 7A and 7B are charts showing a state of generating a mountain-shaped drive waveform by switching the switches. FIG. 7A shows a state where a voltage is changed to output the mountain-shaped drive waveform. FIG. 7B shows a state of switching the switches. In FIG. 7B, the connection state of each of the switches is expressed by a rectangular waveform in which the value is "0" when the switch is OFF and the value is "1" when the switch is ON. Hatched portions in FIG. 7B indicate that the capacitors C1 to C3 or the second power supply Vb is connected to the piezo element 104. In the hatched portion at the upper left corner of FIG. 7B for example, the switch S1H is set to ON, and the switch S1L is set to OFF. Therefore, the hatched portion indicates that the capacitor C1 connected in parallel to the set of switches S1 is connected to the piezo element 104. In the lowermost hatched portion of FIG. 7B, the switch SbH is set to ON, and the switch SbL is set to OFF. Therefore, the hatched portion indicates that the second power supply Vb connected to the set of switches Sb is connected to the piezo element 104. Conversely, unhatched portions indicate that the corresponding capacitor or the second power supply Vb is not connected to the piezo element 104.

First, as shown in FIG. 7B, the switches S1H to SbH are set to OFF, and the switches S1L to SbL are set to ON. With this setting, none of the capacitors C1 to C3 and the second power supply Vb are connected to the piezo element 104, whereby a voltage 0 is applied to the piezo element 104. FIG. 7A shows a state of applying the voltage 0 to the piezo element 104 by setting the switch S1H to SbH to OFF and setting the switches S1L to SbL to ON.

Next, the switch S1H is ON, and the switch S1L is OFF. Then, as shown in FIG. 7B, the capacitor C1 is connected to the piezo element 104, and the voltage Vs stored in the capacitor C1 is applied to the piezo element 104. FIG. 7A shows a state where a voltage to be applied to the piezo element 104 increases from the voltage 0 to the voltage Vs by switching the switches.

Next, the switch S1H and the switch S2H are ON, and the switch S1L and the switch S2L are OFF. Then, as shown in FIG. 7B, the two capacitors C1 and C2 are connected to the piezo element 104, and the total voltage (voltage 2Vs) of the capacitors is applied to the piezo element 104. As a result, as shown in FIG. 7A, the voltage to be applied to the piezo element 104 increases from the voltage Vs to the voltage 2Vs. Next, the switches S1H to S3H are ON, and the switches S1L to S3L are OFF. Then, the three capacitors C1 to C3 are connected to the piezo element 104, and the voltage to be applied to the piezo element 104 increases from the voltage 2Vs to the voltage 3Vs.

After all the three capacitors C1 to C3 are connected to the piezo element 104 as described above, the connections of all the capacitors C1 to C3 and the piezo element 104 are released. Instead, the second power supply Vb is connected to the piezo element 104. That is, as shown in FIG. 7B, the connections of the switches S1H to S3H are switched from ON to OFF, and the connections of the switches S1L to S3L are switched from OFF to ON, whereby the connections of the capacitors C1 to C3 are released. Then, the connection of the switch SbH is switched from OFF to ON, the connection of the switch SbL is switched from ON to OFF, and the second power supply Vb is connected to the piezo element 104. Then, the voltage to be applied to the piezo element 104 is the voltage Vb generated by the second power supply Vb. When the voltage Vb generated by the second power supply Vb is set higher than the voltage 3Vs, the voltage to be applied to the piezo element 104 can be increased from the voltage 3Vs to the voltage Vb by switching the connection state from a state where the three capacitors C1 to C3 are connected to a state where the second power supply Vb is connected. When the voltage Vb generated by the second power supply Vb is set to 4Vs, an increase in voltage obtained by switching the connection state from the state where the three capacitors C1 to C3 are connected to the state where the second power supply Vb is connected is Vs, which is the same amount as an increase in voltage when a capacitor is additionally connected. This makes it possible to apply a highly accurate voltage waveform, which is preferable.

In the state where the second power supply Vb is connected to the piezo element 104, when the switch S1H is ON, and the switch S1L is OFF to connect the capacitor C1, the voltage to be applied to the piezo element 104 can be increased from the voltage Vb to a voltage Vs+Vb. When the capacitor C2 is also connected, the voltage to be applied to the piezo element 104 can be increased from the voltage Vs+Vb to a voltage 2Vs+Vb. Further, when all the capacitors C1 to C3 are connected in addition to the second power supply Vb, the voltage to be applied to the piezo element 104 can be increased to a highest voltage 3Vs+Vb.

When the connection of the capacitor C3 is released in the state where the highest voltage 3Vs+Vb is applied (that is, when the switch S3H is OFF, and the switch S3L is ON), the voltage to be applied to the piezo element 104 decreases from the voltage 3Vs+Vb to the voltage 2Vs+Vb. Further, when the connection of the capacitor C2 is also released (the switch S2H is OFF, and the switch S2L is ON), the applied voltage of the piezo element 104 decreases from the voltage 2Vs+Vb to the voltage Vs+Vb. Further, when the connection of the capacitor C1 is also released (the switch S1H is OFF, and the switch S1L is ON), the applied voltage decreases from the voltage Vs+Vb to the voltage Vb.

In the case of further decreasing the applied voltage of the piezo element 104, the connection between the second power supply Vb and the piezo element 104 is released (the switch SbH is OFF, and the switch SbL is ON), and the three capacitors C1 to C3 are connected to the piezo element 104 (the switches S1H to S3H are ON, and the switches S1L to S3L are OFF). As described above, since the voltage Vb generated by the second power supply Vb is higher than the total voltage 3Vs of the three capacitors C1 to C3, the voltage to be applied to the piezo element 104 can be decreased from the voltage Vb to the voltage 3Vs by switching the connection in this manner. Further, in the state where the three capacitors C1 to C3 are connected to the piezo element 104, when the connections of the capacitors are released one by one, the applied voltage of the piezo element 104 decreases with the release. When the connections of all the capacitors are released, the applied voltage is decreased to the voltage 0. In the drive waveform generator 204 of the embodiment as described above, the switches are sequentially switched in a certain order, so that a voltage waveform according to the switching order is generated. Hereinafter, the order of the connection states of the switches that are switched for generating a certain voltage waveform is also referred to as "switching sequence".

As described above, when the switches are switched according to a predetermined switching sequence, a voltage can be changed in eight steps within a range from the voltage 0 to the voltage 3Vs+Vb to generate a mountain-shaped voltage waveform. It is apparent that various voltage waveforms in addition to the mountain-shaped voltage waveform can be generated by properly setting the switching sequence of the switches.

In the above description, the voltage Vb generated by the second power supply Vb is higher than the total voltage 3Vs of the three capacitors C1 to C3. However, the voltage Vb generated by the second power supply Vb may not necessarily be higher than the total voltage 3Vs of the three capacitors C1 to C3. For example, when the voltage Vb generated by the second power supply Vb is higher than the voltage 2Vs but lower than the voltage 3Vs, the state where all the three capacitors C1 to C3 are connected and the state where only the second power supply Vb is connected are exchanged in the sequence. That is, after the state where the two capacitors C1 and C2 are connected, the state where only the second power supply Vb is connected is set. Next, the connection of the second power supply Vb is released, and instead, the three capacitors C1 to C3 are connected. Next, the second power supply Vb and the capacitor C1 alone are connected.

When an electrical load that is driven by using the thus generated voltage waveform is a load having a capacitive component (the piezo element 104 in the embodiment), the load can be driven very efficiently. That is, in the case of increasing a voltage to be applied, the connections of the three capacitors C1 to C3 and the second power supply Vb are switched as described above to generate a higher voltage, and the voltage is applied to the piezo element 104. Then, charge is supplied from the capacitors or the second power supply Vb, and the charge is stored in the piezo element 104. With an increase in amount of the stored charge, a voltage across terminals of the piezo element 104 increases. Open arrows shown in FIG. 7A indicate a state where charge is supplied to the piezo element 104 to increase an applied voltage every time the connections of the three capacitors C1 to C3 and the second power supply Vb are switched to generate a higher voltage.

Conversely, in the case of decreasing an applied voltage of the piezo element 104, the connections of the three capacitors C1 to C3 and the second power supply Vb are switched to generate a lower voltage, and they are connected to the piezo element 104 in that state. This time, since a voltage of the piezo element 104 is higher than that of the capacitor side, the charge stored in the piezo element 104 is discharged. With a decrease in amount of the stored charge, the voltage across the terminals of the piezo element 104 decreases. Moreover, the charge discharged from the piezo element 104 in this manner flows into the capacitor connected to the piezo element 104 at that time and are stored therein. Hatched arrows in FIG. 7A indicate a state where the charge stored in the piezo element 104 is discharged to decrease an applied voltage every time the connection state of the three capacitors C1 to C3 and the second power supply Vb is switched to a state of generating a lower voltage. As described above with reference to FIG. 6A or FIG. 5A, when a voltage to be generated is the voltage Vb or the voltage 0, charge discharged from the piezo element 104 is not stored in the capacitor but earthed to ground because there is no capacitor connected to the piezo element 104. Some arrows shown by broken lines among the plurality of hatched arrows in FIG. 7A indicate that the charge discharged from the piezo element 104 is earthed to ground.

In the drive waveform generator 204 of the embodiment as described above, in the case of decreasing an applied voltage of the piezo element 104, most of the charge discharged from the piezo element 104 is stored in the capacitors C1 to C3. When an applied voltage of the piezo element 104 is next increased, the charge stored in the capacitors C1 to C3 is supplied to the piezo element 104 to increase the applied voltage. Therefore, the piezo element 104 can be driven with very high power efficiency.

In the drive waveform generator 204 of the embodiment, the connections of the plurality of capacitors (the three capacitors C1 to C3 in this case) are not simply switched, but the second power supply Vb generating a voltage different from that of the capacitors is prepared, and the connections of the plurality of capacitors and the second power supply Vb are switched. Therefore, a highly accurate voltage waveform can be output while miniaturizing the drive waveform generator 204. This will be described in detail below.

Figure 8:
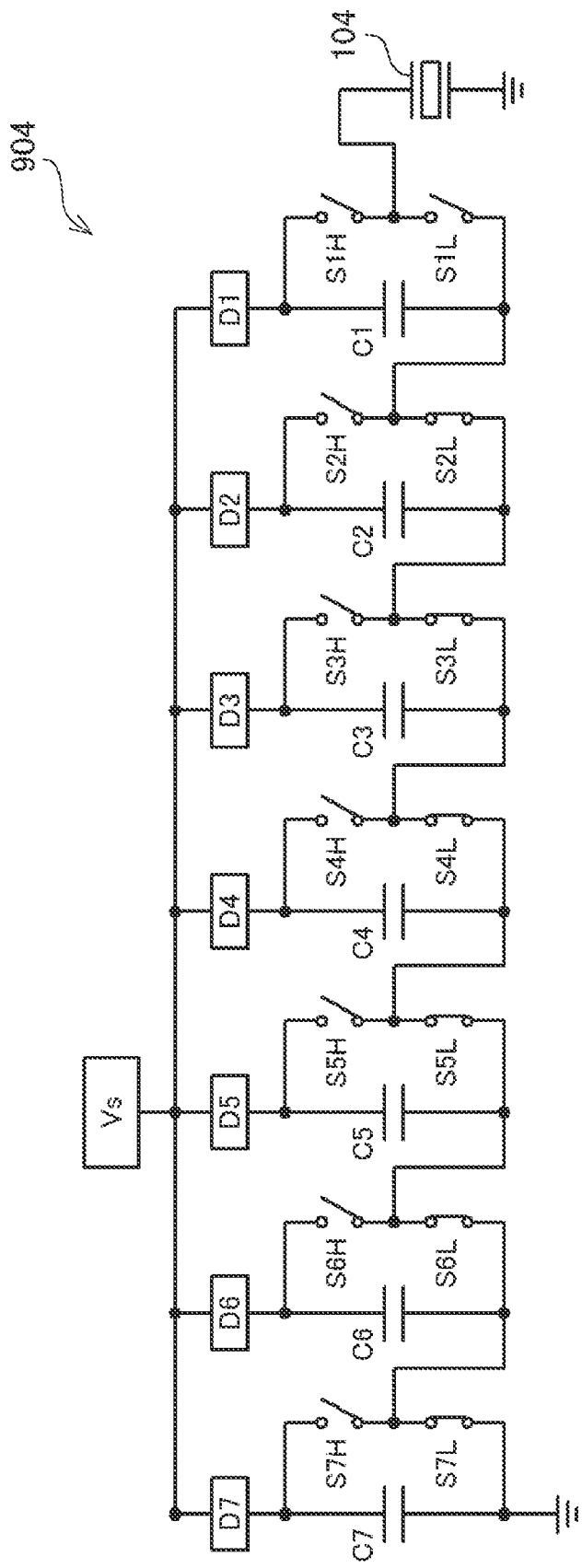
FIG. 8 is an explanatory view showing a drive waveform generator for outputting a voltage waveform equivalent to that of a drive waveform generator of the embodiment without using the second power supply.

FIG. 8 is an explanatory view showing a drive waveform generator 904 for outputting a voltage waveform equivalent to that of the drive waveform generator 204 of the embodiment without using the second power supply Vb. As shown in FIG. 7A, in the drive waveform generator 204 of the embodiment, an output voltage can be changed in eight steps (seven steps not including ground). When it is attempted to change an output voltage in eight steps (seven steps not including ground) by using capacitors without using the second power supply Vb, seven capacitors C1 to C7 are required as shown in FIG. 8. Moreover, a set of switches having two switches as a set are required for each of the capacitors C1 to C7.

One of the two switches constituting each of the sets of switches is connected to a terminal of each of the capacitors on the high potential side, and the other switch is connected to a terminal of the capacitor on the low potential side. As a result, similarly to the drive waveform generator 204 of the embodiment, one set of switches are connected in parallel with respect to each of the capacitors. Moreover, the capacitors C1 to C7 are connected to the first power supply Vs via diodes D1 to D7 for preventing the back flow of current.

The thus configured drive waveform generator 904 in FIG. 8 operates in the same manner as the drive waveform generator 204 of the embodiment. That is, when switches S1L to S7L connected to the terminals of the capacitors C1 to C7 on the low potential side are ON, and switches S1H to S7H connected to the terminals on the high potential side are OFF, the first power supply Vs can be connected to the capacitors C1 to C7 to charge them. In FIG. 8, the switch S1L connected to the terminal of the capacitor C1 on the low potential side is OFF. However, it is possible to charge the capacitors C1 to C7 in either case where the switch S1L is set to ON or OFF.

After charging the capacitors C1 to C7, the connections of the set of switches (two switches, one connected to the terminal on the high potential side and the other connected to the terminal on the low potential side) connected in parallel to the capacitor are properly set. Therefore, the voltage charged to the capacitor can be applied to the piezo element 104. For example, in the case of applying a voltage of the capacitor C1 to the piezo element 104, the switch S1H connected to the terminal on the high potential side, between the set of switches S1 (the switch S1H and the switch S1L) connected in parallel to the capacitor C1, is ON, and the switch S1L connected to the terminal on the low potential side is OFF. When a plurality of capacitors are connected, the capacitors are brought into a state where they are connected in series. Therefore, the total voltage of the capacitors is to be applied to the piezo element 104. Since seven capacitors are disposed in the drive waveform generator 904 shown in FIG. 8, an applied voltage can be changed in seven steps (eight steps including ground) by changing the number of capacitors connected to the piezo element 104.

As is apparent from the comparison between the drive waveform generator 204 of the embodiment shown in FIG. 3 and the drive waveform generator 904 shown in FIG. 8, whereas the drive waveform generator 204 of the embodiment has three capacitors, the drive waveform generator 904 in FIG. 8 requires seven capacitors. As described above with reference to FIGS. 7A and 7B, an applied voltage of the piezo element 104 is increased by supplying the charge stored in a capacitor, and the applied voltage is decreased by recovering the charge discharged from the piezo element 104. Therefore, the capacitor requires a capacitance sufficiently larger than the piezo element 104. This increases the dimension of the capacitor, and the number of capacitors increases from three to seven, leading to a significant increase in size of the circuit. Moreover, when a plurality of capacitors are connected in series, the combined capacitance of the capacitors connected in series decreases as the number of capacitors increases. Accordingly, when the maximum number of capacitors connected in series increases from three to seven, an electrostatic capacitance of each capacitor has to be increased for compensating for a decrease in combined capacitance. As a result, the size of the circuit further increases. In addition, along with an increase in the number of capacitors, the number of switches also increases from eight to 14. As a result, the numbers of capacitors and switches increase in the drive waveform generator 904 shown in FIG. 8, although there is no second power supply Vb, compared to the drive waveform generator 204 of the embodiment shown in FIG. 3, resulting in an increase in size of the circuit. Conversely, in the drive waveform generator 204 of the embodiment, since the second power supply Vb not charging the capacitors is mounted in addition to the first power supply Vs charging the capacitors, the numbers of capacitors and switches are greatly reduced to miniaturize the circuit.

The reason why the drive waveform generator 204 of the embodiment can miniaturize the circuit by mounting the second power supply Vb can be considered as follows. First, in the drive waveform generator 904 shown in FIG. 8, when the number of capacitors connected to the piezo element 104 is zero, the voltage 0 is applied, and when the number of capacitors connected is one, the voltage Vs is applied. As the number of capacitors connected increases, an applied voltage increases. When all the seven capacitors are connected, an applied voltage reaches a highest voltage (voltage 7Vs).

As described above with reference to FIGS. 7A and 7B, on the other hand, in the drive waveform generator 204 of the embodiment, the number of capacitors connected to the piezo element 104 is increased one by one without connecting the second power supply Vb, whereby an applied voltage increases from the voltage 0 to the voltage 3Vs. Moreover, the second power supply Vb is connected, and the number of capacitors connected to the piezo element 104 is increased one by one, whereby an applied voltage can be increased from the voltage Vb to the voltage 3Vs+Vb. In the end, an operation (switching sequence) of increasing the number of capacitors connected to the piezo element 104 one by one is conducted twice while an applied voltage of the piezo element 104 is increased from the voltage 0 to the voltage 3Vs+Vb.

As described above, in the drive waveform generator 904 in FIG. 8, the operation (switching sequence) of increasing the number of capacitors connected is conducted only once while an applied voltage is increased from the lowest voltage (voltage 0) to the highest voltage (voltage 7Vs). In the drive waveform generator 204 of the embodiment, on the other hand, the operation (switching sequence) of increasing the number of capacitors connected one by one is conducted twice while an applied voltage is increased from the lowest voltage (voltage 0) to the highest voltage (voltage 3Vs+Vb). In other words, the same capacitors are used twice. In the drive waveform generator 204 of the embodiment, therefore, the number of required capacitors can be reduced to half.

The same applies to the case of decreasing a voltage to be applied to the piezo element 104. That is, in the drive waveform generator 904 shown in FIG. 8, the number of capacitors connected to the piezo element 104 is decreased one by one, whereby an applied voltage is decreased. Accordingly, only one switching sequence is conducted while the applied voltage is decreased from the highest voltage (voltage 7Vs) to the lowest voltage (voltage 0). In the drive waveform generator 204 of the embodiment, on the other hand, an operation (switching sequence) of decreasing the number of capacitors connected to the piezo element 104 one by one is conducted twice while an applied voltage is decreased from the highest voltage (voltage 3Vs+Vb) to the lowest voltage (voltage 0). In other words, one capacitor is used twice. In this manner, since the drive waveform generator 204 of the embodiment can utilize one capacitor twice also in the case of decreasing an applied voltage, the number of required capacitors can be reduced to half. As described above, as the number of capacitors decreases, the number of switches also decreases. Therefore, the circuit can be greatly miniaturized.

A significant reduction in the number of capacitors makes it possible not only to miniaturize the circuit but also to improve the output accuracy of a voltage waveform. Further, it can improve a power efficiency. This is for the reason described below. When the number of capacitors increases, the number of switches also increases. Since a switch has an electrical resistance, the entire resistance increases as the number of switches increases. For example, when the capacitor C1 is connected to the piezo element 104 in the drive waveform generator 904 shown in FIG. 8, for the set of switches corresponding to the capacitor C1, the switch S1H on the high potential side is ON, and the switch S1L on the low potential side is OFF. In addition, for the sets of switches corresponding to the other capacitors C2 to C7, the switches S2H to S7H on the high potential side are OFF, and the switches S2L to S7L on the low potential side are ON. As a result, for connecting the capacitor C1 to the piezo element 104, the switch S1H and the switches S2L to S7L, seven switches in total, are gone through. When the two capacitors C1 and C2 are connected to the piezo element 104, for the sets of switches corresponding to the capacitor C1 and the capacitor C2, the switches S1H and S2H on the high potential side are ON, and the switches S1L and S2L on the low potential side are OFF. In addition, for the sets of switches corresponding to the other capacitors C3 to C7, the switches S3H to S7H on the high potential side are OFF, and the switches S3L to S7L on the low potential side are ON. As a result, also for connecting the two capacitors C1 and C2 to the piezo element 104, the switch S1H, the switch S2H, and the switches S3L to S7L, seven switches in total, are gone through. In the drive waveform generator 904 shown in FIG. 8 in this manner, when a voltage is applied to the piezo element 104, seven switches are always gone through.

In the drive waveform generator 204 of the embodiment, on the other hand, when a voltage is applied to the piezo element 104, only four switches are gone through. As exemplified in FIG. 5A for example, when only the capacitor C1 is connected to the piezo element 104, four switches of the switch S1H, the switch S2L, the switch S3L, and the switch SbL are gone through. Alternatively, as exemplified in FIG. 6C, when the capacitors C1 and C2 and the second power supply Vb are connected to the piezo element 104, four switches of the switch S1H, the switch S2H, the switch S3L, and the switch SbH are gone through.

In the drive waveform generator 904 shown in FIG. 8, since the number of capacitors mounted thereon increases, the number of switches gone through when a voltage is applied to the piezo element 104 increases. As described above, a voltage is applied to the piezo element 104 as a capacitive electrical load by the supply of charge from the capacitors (or the second power supply Vb). Accordingly, when the number of switches to be gone through increases, the resistance of switch increases. Therefore, even when a capacitor is additionally connected to the piezo element 104, charge cannot be immediately supplied. As a result, a voltage (drive voltage) appearing across the terminals of the piezo element 104 cannot be immediately increased. As the resistance of switch increases, a power loss increases. As a result, a power efficiency is decreased.

The same applies to the case of decreasing a voltage to be applied to the piezo element 104. When a plurality of capacitors are connected to the piezo element 104, the capacitors are connected in series to apply a voltage to the piezo element 104. Accordingly, when the number of capacitors connected to the piezo element 104 decreases, a voltage of the piezo element 104 is higher than a voltage generated by the capacitors connected in series, causing charge to flow from the piezo element 104 into the capacitors. As a result, the charge stored in the piezo element 104 decreases, and the voltage (drive voltage) across the terminals of the piezo element 104 decreases. In the drive waveform generator 904 shown in FIG. 8 in this case, also when the charge flows from the piezo element 104 into the capacitors, an electrical resistance increases because many switches are gone through, making it impossible to immediately cause the charge to flow into the capacitors. As a result, the voltage (drive voltage) appearing across the terminals of the piezo element 104 cannot be immediately decreased. This takes time to recover the charge from the piezo element 104 with the capacitors. Therefore, when the time for the recover cannot be assured, the charge cannot be sufficiently recovered, resulting in a decrease in power efficiency. Further, since a power loss occurs due to the resistance of the switches, this also causes a decrease in power efficiency.

Figure 9:
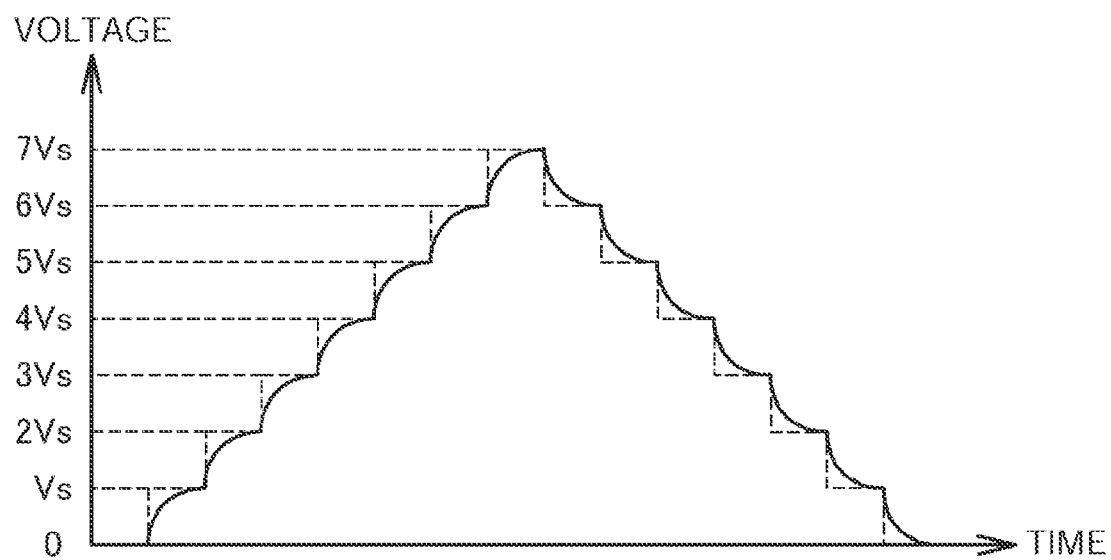
FIG. 9 is a chart showing a voltage waveform to be applied to a piezo element by a drive waveform generator on which many capacitors are mounted.

FIG. 9 is a chart showing a voltage waveform to be applied to the piezo element 104 when the drive waveform generator 904 having many capacitors mounted thereon is used. A stepwise voltage waveform indicated by thin broken lines in the drawing represents a voltage waveform that should be originally applied to the piezo element 104 by switching the switches S1H to S7H and S1L to S7L in FIG. 8. A voltage waveform indicated by bold solid lines in the drawing represents a voltage waveform that is actually applied to the piezo element 104. As shown in the drawing, when voltage increases, an increase in actual voltage is delayed with respect to the voltage waveform that should be originally applied. This is because since the resistance when charge is supplied from the capacitors to the piezo element 104 is large, the charge cannot be immediately supplied. With an increase in the delay, the connections of the switches are switched before the actual applied voltage increases to the highest voltage. In the end, the actual applied voltage may not reach the highest voltage in some cases.

Conversely as shown in FIG. 9, when voltage decreases, a decrease in actual voltage is delayed with respect to the voltage waveform that should be originally applied. This is because since the resistance when the charge stored in the piezo element 104 is discharged is large, the charge in the piezo element 104 cannot be immediately discharged.

In the drive waveform generator 204 of the embodiment shown in FIG. 3, on the other hand, since the number of capacitors is small, the number of switches gone through for applying a voltage to the piezo element 104 is small. As a result, both when charge is supplied to the piezo element 104 and when charge is discharged from the piezo element 104, the charge can be immediately moved. Therefore, a large discrepancy between the voltages shown in FIG. 9 does not occur. As a result, an applied voltage of the piezo element 104 can be immediately changed according to the connection state of the switches, making it possible to accurately drive the piezo element 104. Moreover, since a power loss in the switches can be suppressed, and further the charge from the piezo element 104 can be immediately recovered, a power efficiency can be improved.

Figure 10:
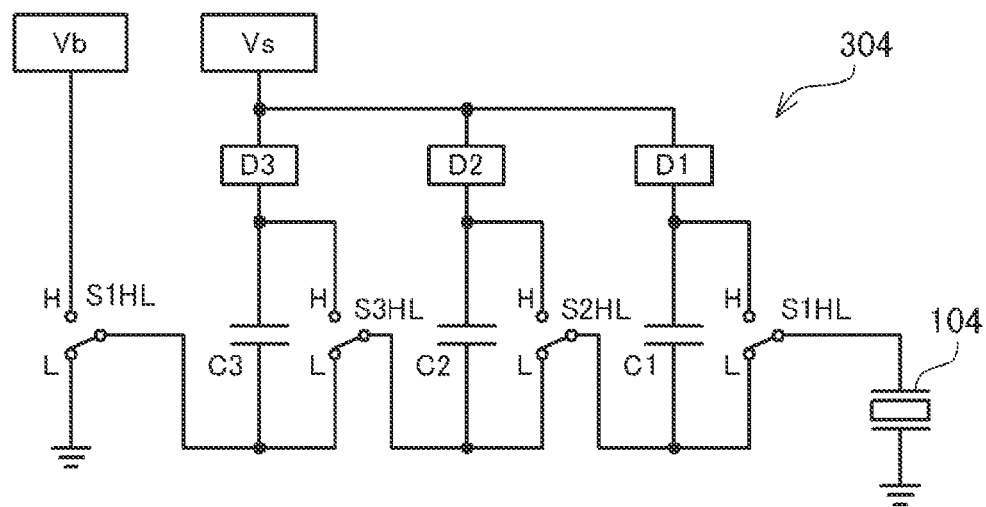
FIG. 10 is an explanatory view exemplifying a drive waveform generator configured of High/Low switching-type switches.

In the above description, the sets of switches S1 to S3 and Sb each configured of two switches are connected to the capacitors C1 to C3 and the second power supply Vb. However, the sets of switches can be replaced by switching type switches (High/Low switching-type switches) capable of switching to High or Low. FIG. 10 is an explanatory view exemplifying a drive waveform generator 304 configured of switches S1HL to S3HL and SbHL of the High/Low switching type. With this configuration, since two ON/OFF type switches constituting a set of switches can be replaced by one High/Low switching-type switch, the number of switches can be further decreased. On the other hand, the ON/OFF switching-type switch can be easily integrated into one chip compared to the High/Low switching-type switch. Accordingly, miniaturization is easier for the drive waveform generator 204 in FIG. 3 configured of the ON/OFF switching-type switches than the drive waveform generator 304 in FIG. 10 configured of the High/Low switching-type switches on the premise of integration.

C. MODIFIED EXAMPLES

There are various modified examples of the above-described drive waveform generator 204 of the embodiment. The modified examples will be briefly described below.

C-1. First Modified Example

In the drive waveform generator 204 of the embodiment, the first power supply Vs only charges the capacitors C1 to C3 and is not connected to the piezo element 104 as an electrical load. However, also the first power supply Vs may be connected to the piezo element 104 similarly to the second power supply Vb.

Figure 11A:
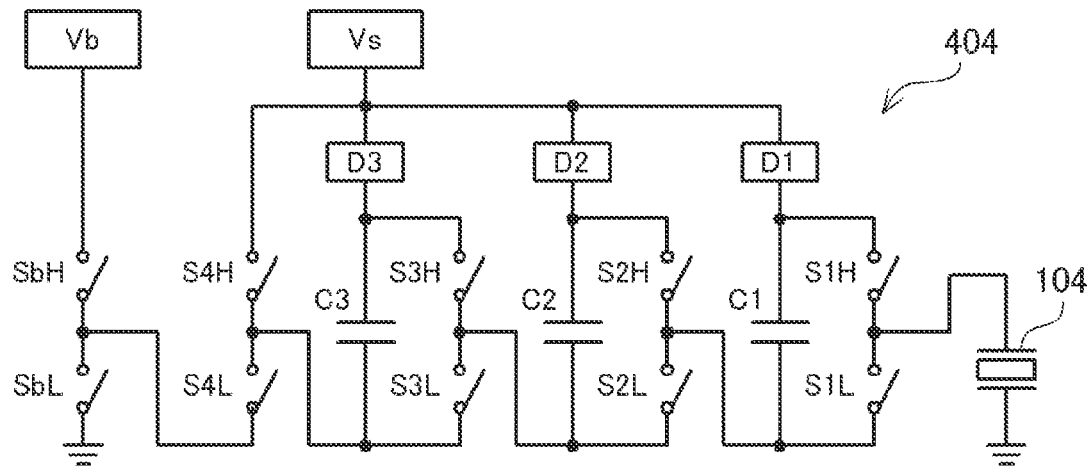
FIGS. 11A and 11B are explanatory views exemplifying a drive waveform generator of a first modified example.
Figure 11B:
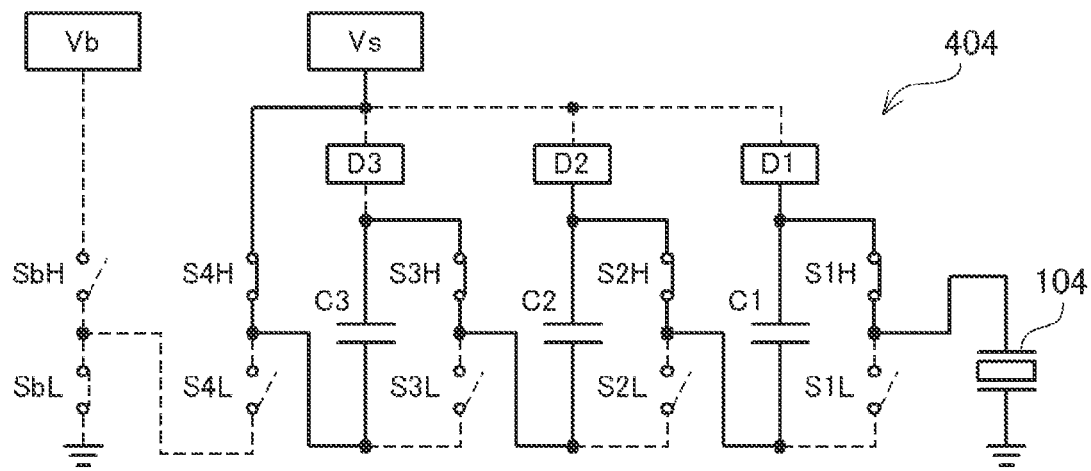

FIGS. 11A and 11B are explanatory views exemplifying a drive waveform generator 404 of a first modified example in which the first power supply Vs is configured to be connectable to the piezo element 104. FIG. 11A shows the circuit configuration of the drive waveform generator 404. FIG. 11B shows a state of connecting the first power supply Vs to the piezo element 104. The first modified example overlaps the above-described embodiment in many portions, and only a portion thereof differs therefrom. In the first modified example, therefore, the constituents that overlap those in the embodiment are denoted by the same reference numerals and signs, and the detailed description thereof is omitted. The difference will be mainly described below.

The drive waveform generator 404 of the first modified example shown in FIG. 11A has a configuration in which two switches S4H and S4L are added to the circuit configuration of the drive waveform generator 204 of the embodiment described with reference to FIG. 3. The two switches S4H and S4L are connected in series to constitute a set of switches. The switch S4H is connected to the first power supply Vs, while the switch S4L is connected between the two switches SbH and SbL constituting the next set of switches Sb. Hereinafter, the set of switches configured of the switch S4H and the switch S4L are also referred to as "set of switches S4" for distinguishing from the other sets of switches. The switch S4H connected to the first power supply Vs, between the two switches S4H and S4L constituting the set of switches S4, is referred to as "switch on the high potential side", and the other switch S4L is referred to as "switch on the low potential side".

The thus configured drive waveform generator 404 of the first modified example can operate in the same manner as the drive waveform generator 204 of the embodiment by setting the switch S4H on the high potential side to OFF and the switch S4L on the low potential side to ON. That is, as shown in FIG. 4, when the switch S2L, the switch S3L, and the switch SbL are ON, and the switches S1H to S3H and SbH are OFF, the capacitors C1 to C3 can be charged. Similarly to FIG. 4, it is possible to charge the capacitors C1 to C3 irrespective of whether the switch S1L is ON or OFF. A desired set of switches are selected from the sets of switches S1 to S3 connected in parallel to the capacitors C1 to C3, a switch on the high potential side constituting the set of switches is ON, and a switch on the low potential side is OFF, whereby a capacitor corresponding to the set of switches can be connected to the piezo element 104. In this case, when a plurality of capacitors are connected, the capacitors are connected to the piezo element 104 while the capacitors remain connected in series.

In the drive waveform generator 204 of the embodiment described above with reference to FIG. 3 in this case, after all the capacitors C1 to C3 are connected to apply the voltage 3Vs to the piezo element 104, the voltage cannot be increased more than that without connecting the second power supply Vb (refer to FIGS. 5A to 5C and 6A to 6C). However, in the drive waveform generator 404 of the first modified example, even after all the capacitors C1 to C3 are connected, a voltage to be applied to the piezo element 104 can be increased one more step by further connecting the first power supply Vs. Specifically, in the state where the three capacitors C1 to C3 are connected to the piezo element 104, the switch S4H on the high potential side of the set of switches S4 connected to the first power supply Vs is ON, and the switch S4L on the low potential side is OFF. Then, as shown in FIG. 11B, the three capacitors C1 to C3 and the first power supply Vs are connected in series, and therefore the total voltage (voltage 4Vs) of them can be applied to the piezo element 104. When the voltage Vb generated by the second power supply Vb is previously set higher than the voltage 4Vs, an applied voltage of the piezo element 104 can be further increased by switching the connection state from the state shown in FIG. 11B to a state where only the second power supply Vb is connected to the piezo element 104.

Figure 12A:
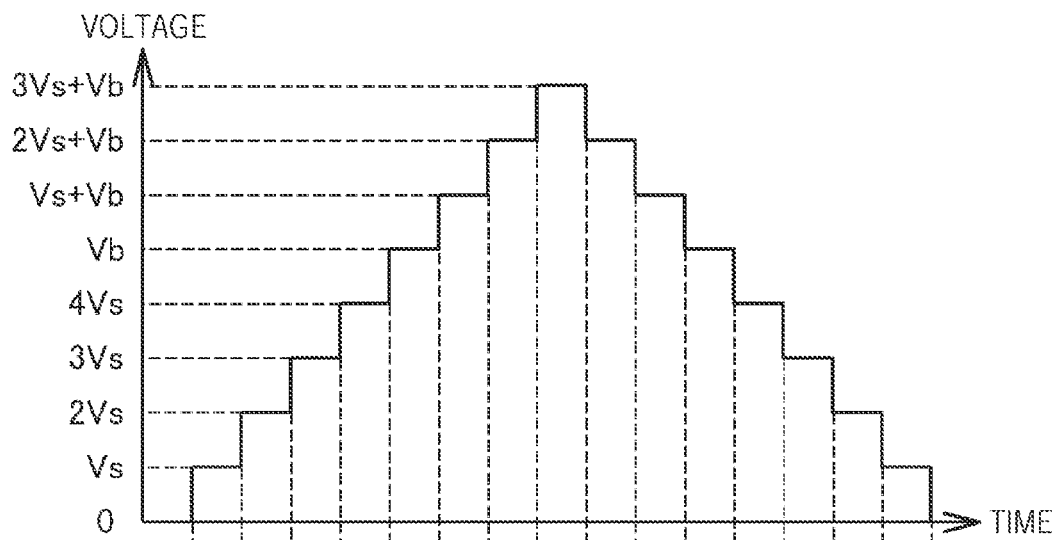
FIGS. 12A and 12B are charts showing a state of outputting a voltage waveform using the drive waveform generator of the first modified example.
Figure 12B:
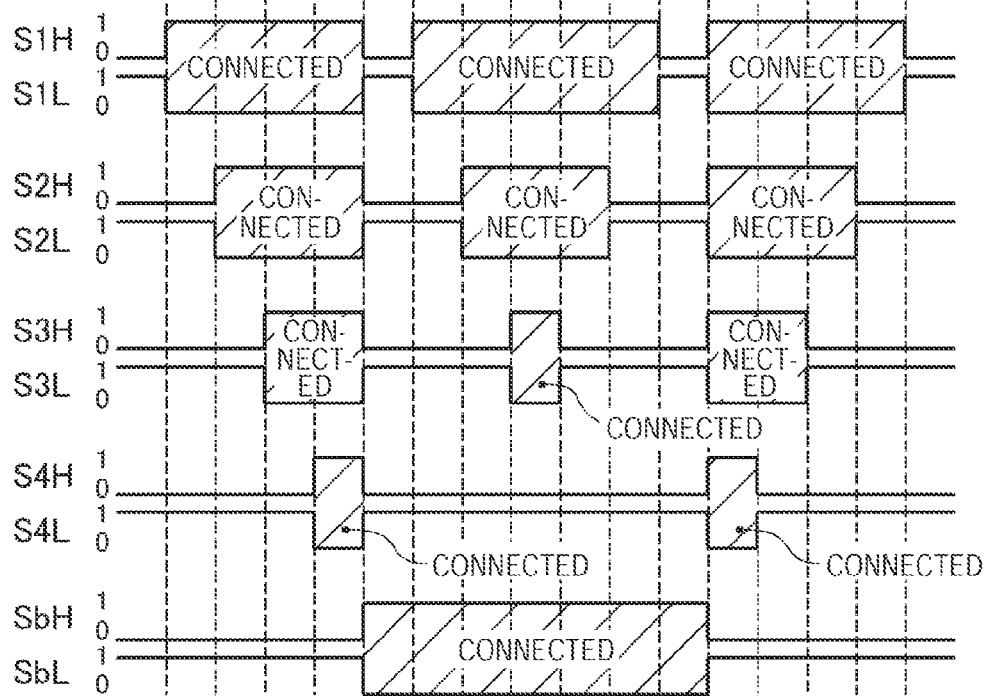

FIGS. 12A and 12B are charts showing a state of outputting a mountain-shaped voltage waveform by using the drive waveform generator 404 of the first modified example. FIG. 12A shows the voltage waveform to be output. FIG. 12B shows the connections of the switches at the time of outputting. In the drive waveform generator 204 of the embodiment described above with reference to FIGS. 7A and 7B, an output voltage can be changed in seven steps (eight steps including ground). In the drive waveform generator 404 of the first modified example, however, an output voltage can be changed in eight steps (nine steps including ground) as shown in FIG. 12A. In the drive waveform generator 404 of the first modified example in this manner, since it is possible to increase the number of gradations that can be output, a more highly accurate voltage waveform can be output.

C-2. Second Modified Example

In the above-described embodiment or first modified example, although it is possible to store charge in the first power supply Vs because the capacitors C1 to C3 are connected thereto, no capacitor for storing charge is connected to the second power supply Vb. However, a capacitor may be connected also to the second power supply Vb to store charge.

Figure 13A:
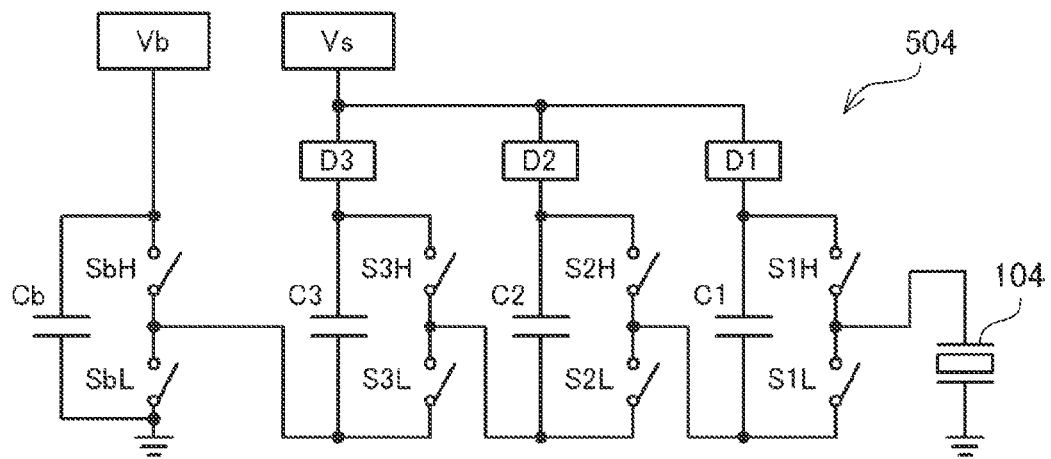
FIGS. 13A and 13B are an explanatory view and a chart, respectively, exemplifying a drive waveform generator of a second modified example in which a capacitor is connected to the second power supply.
Figure 13B:
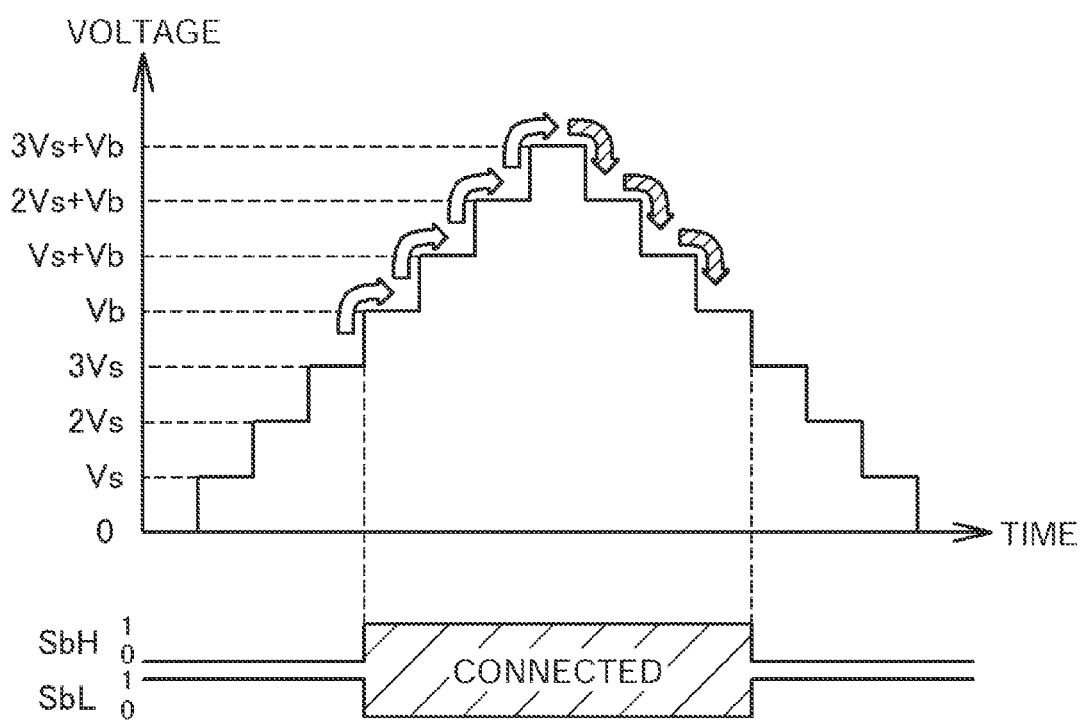

FIGS. 13A and 13B are an explanatory view and a chart, respectively, exemplifying a drive waveform generator 504 of a second modified example in which a capacitor Cb is connected to the second power supply Vb. FIG. 13A exemplifies the circuit configuration of the drive waveform generator 504 of the second modified example. Also the second modified example overlaps the above-described embodiment in many portions, and only a portion thereof differs therefrom. Also in the second modified example, therefore, the constituents that overlap those in the embodiment are denoted by the same reference numerals and signs, and the detailed description thereof is omitted. The difference will be mainly described below.

As shown in FIG. 13A, the drive waveform generator 504 of the second modified example differs from the drive waveform generator 204 of the embodiment in that the capacitor Cb is connected in parallel with respect to the set of switches Sb (that is, the switch SbH and the switch SbL) connected to the second power supply Vb, but has the same configuration in other portions. Moreover, the operation for switching the switches for outputting a voltage waveform is the same as that in the drive waveform generator 204 of the embodiment. However, since the capacitor Cb is added to the drive waveform generator 504 of the second modified example, a capacitive load such as the piezo element 104 can be efficiently driven. This will be described below.

FIG. 13B shows a state of outputting a mountain-shaped voltage waveform by using the drive waveform generator 504 of the second modified example. Also in the drive waveform generator 504 of the second modified example, a voltage is increased from the voltage 0 to the voltage 3Vs by using the capacitors C1 to C3. For increasing a voltage more than the voltage 3Vs, the second power supply Vb is connected to the piezo element 104, and the capacitors C1 to C3 are used. In the case of decreasing a voltage to the voltage Vb, the second power supply Vb is connected to the piezo element 104, and the capacitors C1 to C3 connected to the piezo element 104 are disconnected one by one. In FIG. 13B, a range in which the second power supply Vb is connected is shown hatched.

In the case of increasing an applied voltage of the piezo element 104 while the second power supply Vb remains connected, charge is supplied from the second power supply Vb and the capacitor connected to the piezo element 104 to the piezo element 104 as described above with reference to FIGS. 7A and 7B. Open arrows shown in FIG. 13B indicate that charge is supplied to the piezo element 104. When an applied voltage of the piezo element 104 is decreased while the second power supply Vb remains connected, charge is discharged from the piezo element 104. The discharged charge is stored in the capacitor connected to the piezo element 104 at that time. Hatched arrows in FIG. 13B indicate that the charge discharged from the piezo element 104 is stored in the capacitor.

In the drive waveform generator 204 of the embodiment in this case, since no capacitor is disposed in the second power supply Vb, charge discharged from the piezo element 104 toward the second power supply Vb is earthed to ground as it is without being stored in a capacitor. In the drive waveform generator 504 of the second modified example, on the other hand, since the capacitor Cb is disposed for the second power supply Vb, charge discharged toward the second power supply Vb can be stored in the capacitor Cb.

In the case of decreasing an applied voltage of the piezo element 104 from the voltage Vs+Vb to the voltage Vb in the drive waveform generator 204 of the embodiment, charge discharged from the piezo element 104 cannot be stored because only the second power supply Vb is connected to the piezo element 104 and no capacitor is connected thereto. The arrows shown by the broken outline in FIG. 7A indicate this state. However, in the drive waveform generator 504 of the second modified example shown in FIG. 13A, the capacitor Cb is disposed for the second power supply Vb. Therefore, even in the case of decreasing the applied voltage of the piezo element 104 from the voltage Vs+Vb to the voltage Vb, the charge discharged from the piezo element 104 can be stored in the capacitor Cb.

In the drive waveform generator 504 of the second modified example in this manner, the capacitor Cb is disposed for the second power supply Vb, so that charge can be efficiently recovered for the two above-described reasons. Since the recovered charge can be utilized when an applied voltage is next increased, a capacitive load such as the piezo element 104 can be efficiently driven.

In the drive waveform generator 504 of the second modified example, the capacitor Cb is connected to the second power supply Vb. Therefore, when charge is supplied from the capacitor Cb for increasing an applied voltage of the piezo element 104, and as a result, a charging voltage of the capacitor Cb decreases, the second power supply Vb intends to charge the capacitor Cb. In the case where it is intended to recover the charge discharged from the piezo element 104 with the capacitor Cb when an applied voltage of the piezo element 104 next decreases, excessive charge is stored in the capacitor Cb because the capacitor Cb has already been charged by the second power supply Vb. When charge is stored excessively, a voltage across terminals of the capacitor Cb increases, making it impossible to generate a highly accurate voltage waveform. As a result, the charge stored in the capacitor Cb has to be earthed to ground in the end, which may cause a reduction in power efficiency.

For preventing an immediate replenishment of charge from the second power supply Vb even when the capacitor Cb supplies charge to the piezo element 104 and the charge of the capacitor Cb decreases, a current limiting element may be inserted between the second power supply Vb and the capacitor Cb.

Figure 14A:
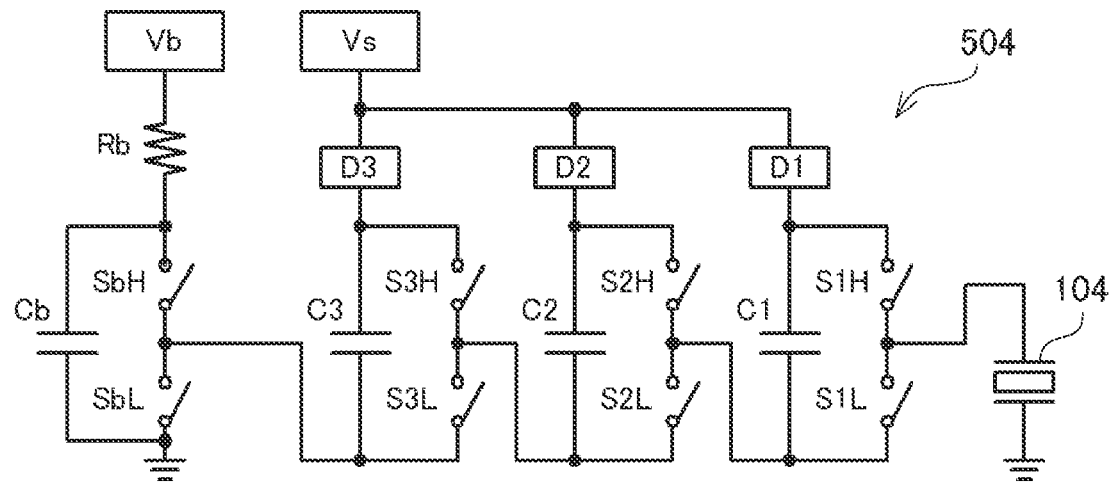
FIGS. 14A and 14B are explanatory views exemplifying a circuit configuration in which a current limiting element is inserted between the second power supply and the capacitor.
Figure 14B:
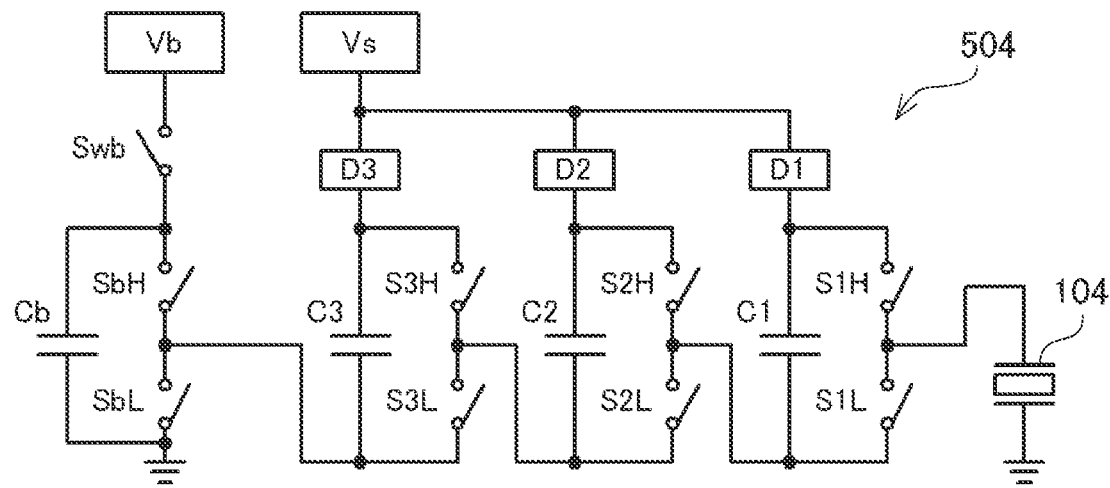

FIGS. 14A and 14B are explanatory views exemplifying a circuit configuration in which a current limiting element is inserted between the second power supply Vb and the capacitor Cb. In FIG. 14A, an electrical resistance Rb is inserted as a current limiting element. When the electrical resistance Rb is previously set to a certain large value, charge is slowly replenished from the second power supply Vb to the capacitor Cb. Therefore, it is possible to prevent the capacitor Cb from being fully charged until the capacitor next recovers charge from the piezo element 104.

Instead of the electrical resistance Rb, an ON/OFF switching-type switch Swb may be inserted. FIG. 14B shows a state of inserting the switch Swb as a current limiting element. When the switch Swb is inserted instead of the electrical resistance Rb, the replenishment of charge from the second power supply Vb to the capacitor Cb can be completely stopped by setting the switch Swb to OFF. Moreover, by setting the switch Swb to ON, the replenishment of charge can be resumed at any time. Therefore, according to the operating condition of the drive waveform generator 504, charge can be replenished to the capacitor Cb more properly.

C-3. Third Modified Example

In the above-described embodiment and first and second modified examples, when the charge of the capacitors C1 to C3 is insufficient, charge can be replenished from the first power supply Vs via the diodes D1 to D3 for compensating the insufficiency of charge. However, special consideration is not made for the case where the charge is excessively stored in the capacitors C1 to C3. However, depending on a voltage waveform to be applied, charge may be excessively stored in any of the capacitors. In such a case, the charge excessively stored in the capacitor may be discharged as follows.

Figure 15A:
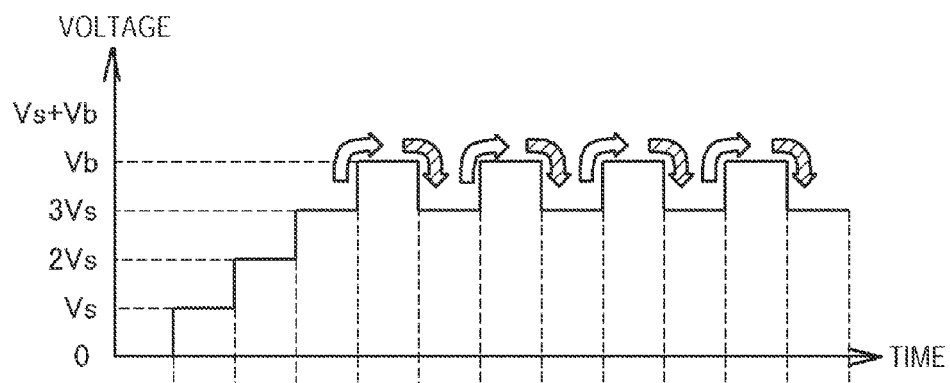
FIGS. 15A to 15C are charts exemplifying the case where charge is excessively stored in a capacitor with an applied voltage waveform.
Figure 15B:
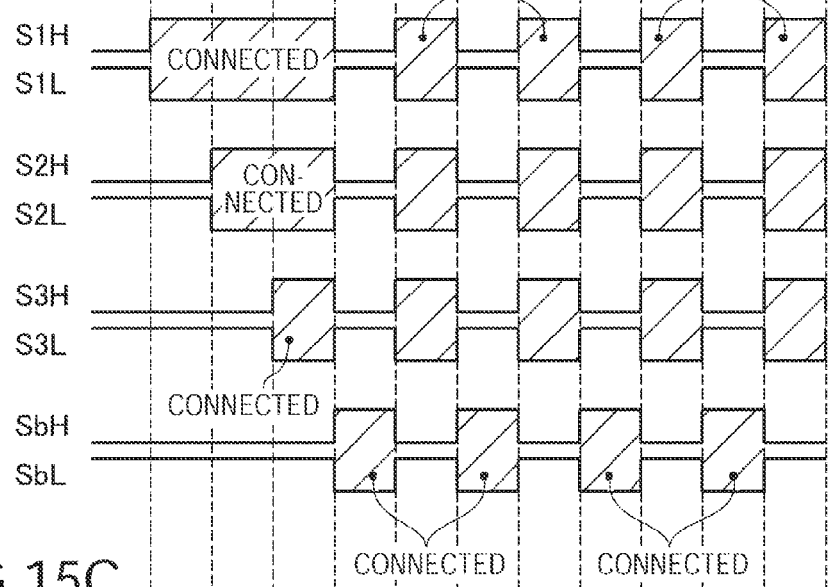
Figure 15C:
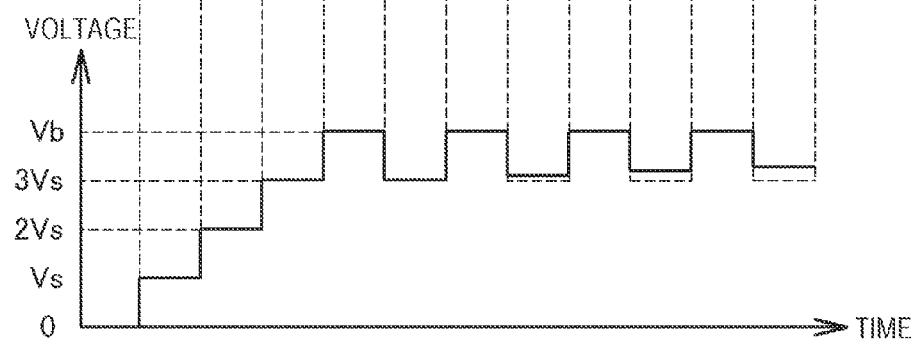

FIGS. 15A to 15C are charts exemplifying the case where charge is excessively stored in a capacitor with a voltage waveform to be applied. FIG. 15A shows a voltage waveform to be applied. FIG. 15B shows switching sequences for switching the connections of the switches. As shown in FIG. 15A, in the case where an applied voltage is switched back and forth many times between the voltage 3Vs and the voltage Vb, charge is supplied to the piezo element 104 when the voltage is increased, and charge is discharged from the piezo element 104 when the voltage is decreased. Open arrows and hatched arrows shown in FIG. 15A indicate that charge is transferred to and from the piezo element 104.

In the case of increasing an applied voltage from the voltage 3Vs to the voltage Vb, since only the second power supply Vb is connected to the piezo element 104 as shown in FIG. 15B, charge is supplied from the second power supply Vb. On the other hand, in the case of decreasing the applied voltage from the voltage Vb to the voltage 3Vs, since the capacitors C1 to C3 are connected to the piezo element 104, charge discharged from the piezo element 104 is stored in the capacitors C1 to C3. Accordingly, when the applied voltage is switched back and forth many times between the voltage 3Vs and the voltage Vb, the second power supply Vb unilaterally supplies charge to the piezo element 104, and the charge is unilaterally stored in the capacitors C1 to C3, whereby the charge is excessively stored in the capacitors C1 to C3.

When excessive charge is stored in the capacitors C1 to C3, a voltage across the terminals of each of the capacitors C1 to C3 increases. As a result, when the capacitors C1 to C3 are connected to the piezo element 104, a voltage to be applied to the piezo element 104 is high. FIG. 15C shows a state where, as a result of storing excessive charge in the capacitors C1 to C3 when the applied voltage is switched back and forth between the voltage 3Vs and the voltage Vb, the voltage when the capacitors C1 to C3 are connected increases gradually from the original voltage 3Vs.

In the third modified example, while the charge discharged from the piezo element 104 is recovered with a capacitor, the charge stored in the capacitor is discharged to ground only for a very short time. As described above, in the case of connecting a capacitor to the piezo element 104, a switch on the high potential side of a set of switches connected in parallel to the capacitor is set to ON, and a switch on the low potential side is set to OFF. Therefore, while the switch on the high potential side remains ON, the switch on the low potential side is also switched to ON only for a short time. Thus, only during the period, the charge stored in the capacitor can be earthed to ground. It is sufficient to perform the operation only for a capacitor in which charge is excessively stored, and it is not necessary to perform the operation for all the capacitors.

Figure 16A:
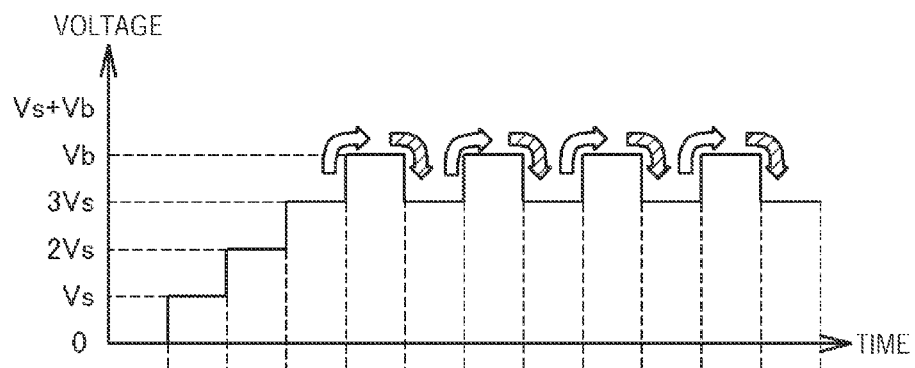
FIGS. 16A to 16C are charts exemplifying a third modified example in which charge excessively stored in a capacitor is discharged.
Figure 16B:
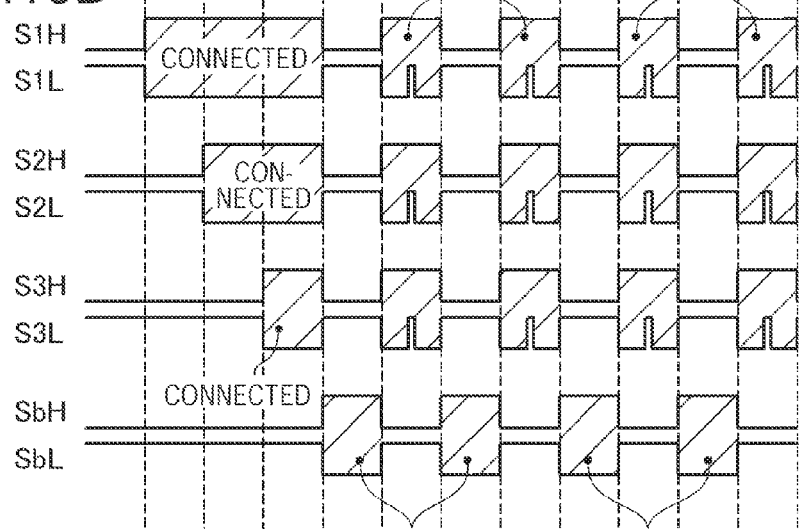
Figure 16C:
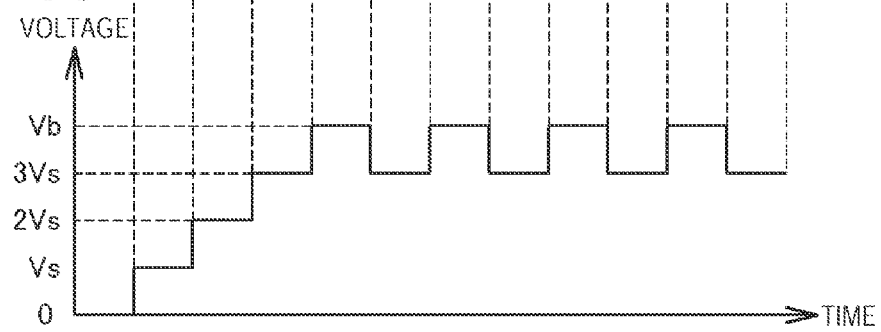

FIGS. 16A to 16C are charts exemplifying a state where a switch on the low potential side is switched to ON only for a short time during the period in which a switch on the high potential side is ON, so that a capacitor is prevented from excessively storing charge, in the third modified example. As described above with reference to FIGS. 15A to 15C, when an applied voltage is switched back and forth between the voltage 3Vs and the voltage Vb, excessive charge is stored in the capacitors C1 to C3. In FIGS. 16A to 16C, therefore, while the capacitors C1 to C3 are connected to recover the charge from the piezo element 104, the switches S1L to S3L on the low potential side are switched to ON only for a short time. Thus, the charge excessively stored in the capacitors C1 to C3 is earthed to ground. As a result, since shifting of an applied voltage to a higher level can be avoided as shown in FIG. 16C, it is possible to apply a highly accurate voltage waveform.

In the third modified example shown in FIGS. 16A to 16C, the first power supply Vs is shorted to ground only during the period in which the switches S1H to S3H on the high potential side and the switches S1L to S3L on the low potential side are ON. Therefore, when an electrical resistance is inserted on the upstream or downstream side of the diodes D1 to D3, the shorted state can be avoided. Alternatively, when a switch is inserted instead of the diodes D1 to D3, it is possible to prevent the first power supply Vs from being shorted to ground by temporarily setting the switch to OFF.

C-4. Fourth Modified Example

In some capacitive loads, the magnitude of a capacitive component greatly fluctuates. For example, a large number of the ejection nozzles 100 are mounted on the inkjet printer 10, and the piezo element 104 is disposed for each of the ejection nozzles 100. Depending on an image desired to be printed, a large number of the piezo elements 104 may be driven in some cases, and some of the piezo elements 104 may be driven in other cases. As the number of the piezo elements 104 to be driven increases, the capacitive component of the load increases. Conversely, as the number of the piezo elements 104 to be driven decreases, the capacitive component of the load decreases. As a result, in the drive waveform generator 204 of the embodiment, the capacitive component of the load may greatly fluctuate.

When the capacitive component of a load greatly fluctuates in this manner, applying a highly accurate voltage may be difficult even when a voltage is applied in the same manner. For example, when the capacitive component of a load increases, the amount of charge to be supplied to the load increases for increasing a voltage by a certain voltage. Therefore, the supply of charge cannot keep up with the increase, which makes it impossible in some cases to immediately increase an applied voltage. Alternatively, in the case of decreasing an applied voltage, when the capacitive component of a load is large, the amount of charge to be discharged by the load increases for decreasing the applied voltage by a certain voltage. Therefore, excessive charge is likely to be stored in a capacitor, and a voltage across the terminals of the capacitor increases, whereby a highly accurate voltage may not be applied. In a fourth modified example, therefore, the following method is employed for making it possible to apply a highly accurate voltage waveform to drive a load even when the capacitive component of the load greatly fluctuates.

Figure 17:
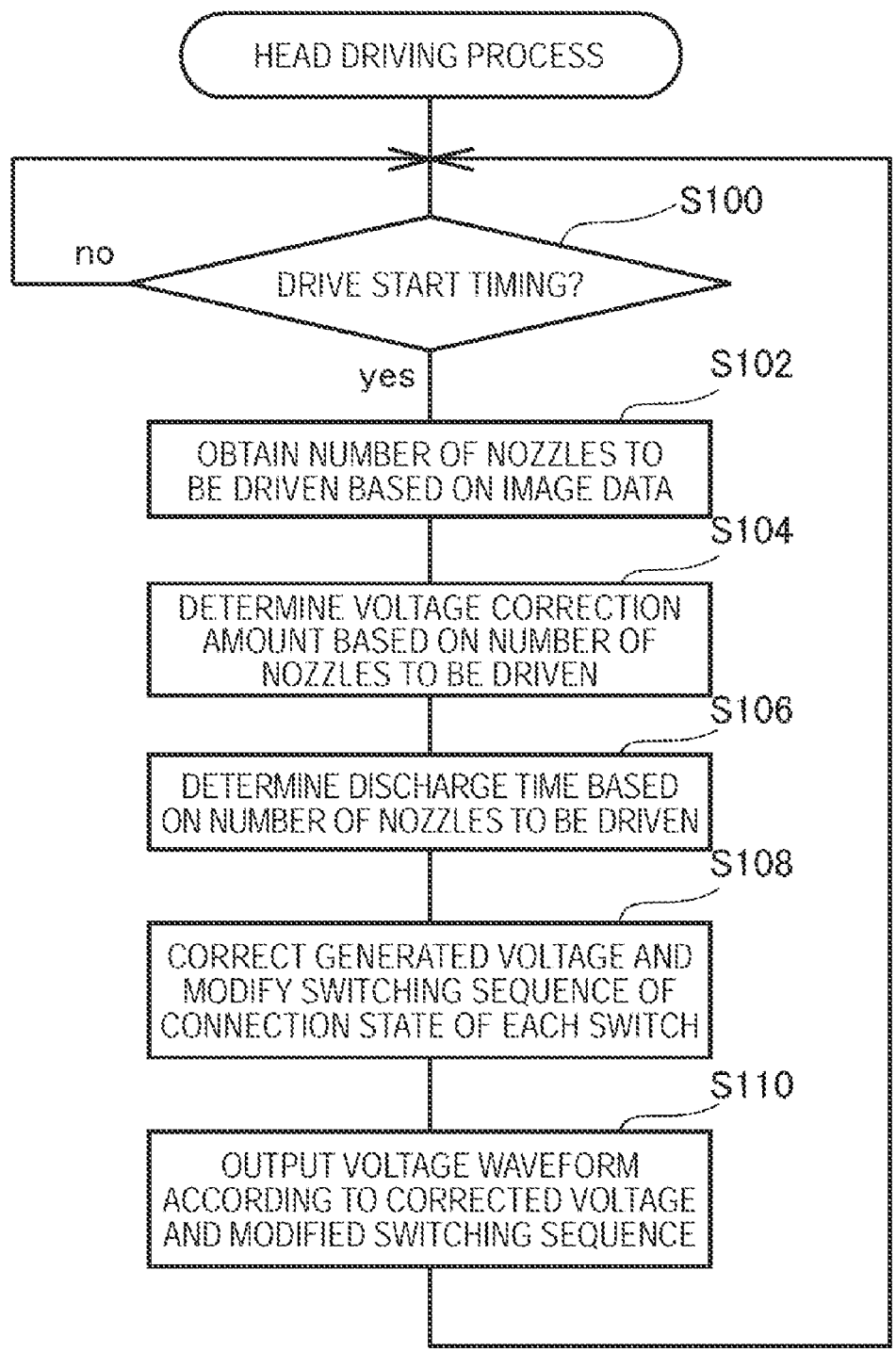
FIG. 17 is a flowchart showing a head driving process of driving an ejection head in a fourth modified example.

FIG. 17 is a flowchart showing a head driving process for driving the ejection head 24 in the fourth modified example. The process is executed by a CPU of the printer control circuit 50 mounted on the inkjet printer 10.

As shown in the drawing, when the head driving process is started, the CPU of the printer control circuit 50 first determines whether or not it is a drive start timing for the ejection head 24 (step S100). As described above with reference to FIG. 1, since the printer control circuit 50 controls the operation of making the carriage 20 reciprocate, the operation of feeding the print medium, and the operation of the ejection head driving circuit 200 that drives the ejection head 24, the printer control circuit 50 can determine whether or not it is the timing of starting the drive of the ejection head 24. As a result, when it is determined that it is not yet the drive start timing (step S100: no), the printer control circuit 50 stands by until the drive start timing while repeating the same determination.

When it is determined that it is the drive start timing (step S100: yes), the printer control circuit 50 obtains the number of nozzles to be driven based on image data desired to be printed (step S102). The "image data" is image data indicating whether or not the inkjet printer 10 forms a dot, which has been subjected to a halftoning process (binarization process). As described above with reference to FIG. 2, although the plurality of ejection nozzles 100 are disposed in the ejection head 24, all the ejection nozzles 100 do not always eject ink. A voltage waveform output from the drive waveform generator 204 is supplied to the gate element 302 of the gate unit 300. Only the piezo element 104 to which the gate element 302 is electrically conducted by the printer control circuit 50 is driven to eject ink from the ejection nozzle 100. In this manner, the printer control circuit 50 controls which of the piezo elements 104 of the ejection nozzles 100 is brought into the conductive state. The printer control circuit 50 can immediately obtain the number of nozzles to be driven based on the image data.

Subsequently, based on the obtained number of nozzles, a voltage correction amount is determined (step S104). That is, as the number of nozzles to be driven increases, the capacitive component of a load (in this case, the ejection head as an assembly of the piezo elements 104) increases. Therefore, the amount of charge to be supplied to the load (the ejection head 24) increases for increasing an applied voltage by a certain voltage. As a result, when the number of nozzles to be driven increases so much, the supply of charge cannot keep up with the increase, making it impossible to increase the applied voltage to a target voltage. Therefore, according to the number of nozzles to be driven, at least one of the generated voltage Vs of the first power supply Vs and the generated voltage Vb of the second power supply Vb is corrected.

Figure 18:
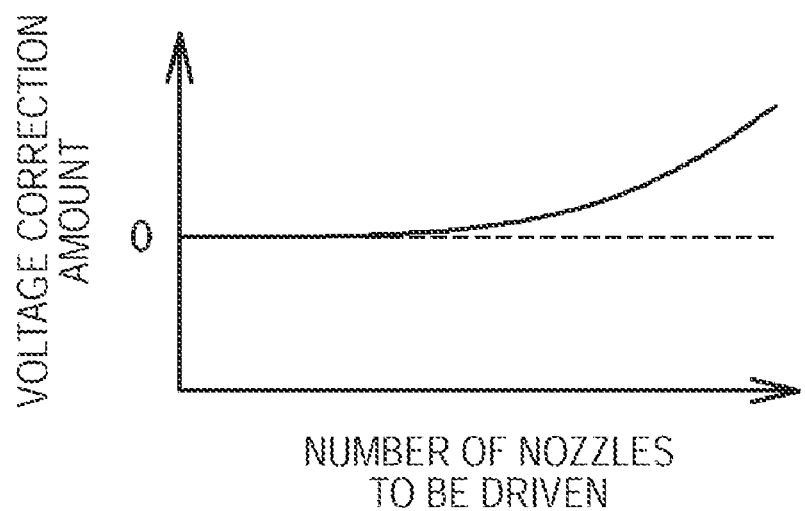
FIG. 18 is a graph showing a voltage correction amount set according to the number of nozzles to be driven.

FIG. 18 is a graph showing a voltage correction amount set according to the number of nozzles to be driven. The voltage correction amount may be a correction amount for the first power supply Vs or the second power supply Vb. As shown in the drawing, when the number of nozzles to be driven is small, the voltage correction amount is set to zero or an extremely small value. However, when the number of nozzles increases to a certain value or more, the voltage correction amount also increases according to the number of nozzles. In the case where the voltage correction amount is determined in this manner, when the number of nozzles to be driven increases to a certain value or more, an applied voltage increases. Therefore, the supply of charge to the load (the ejection head 24 in this case) is facilitated. As a result, an applied voltage can be immediately increased.

A table shown in FIG. 18 is previously stored in a ROM mounted on the printer control circuit 50. At step S104 in FIG. 17, the CPU of the printer control circuit 50 performs a process of determining the voltage correction amount corresponding to the number of nozzles to be driven with reference to the table.

Subsequently, the CPU of the printer control circuit 50 determines this time a discharge time of a capacitor based on the number of nozzles to be driven (step S106). That is, when the number of nozzles to be driven increases, the capacitive component of the load (the ejection head 24 in this case) increases. Therefore, the amount of charge discharged from the load (the ejection head 24) increases when an applied voltage is decreased. As a result, there arises a risk that charge is excessively stored in a capacitor that recovers charge. Controlling is possible when the discharge time of a capacitor is determined according to the number of nozzles to be driven. Specifically, as described above with reference to FIGS. 16A to 16C, a time for discharging the charge of the capacitor to ground by setting a switch on the high potential side of a set of switches connected in parallel to a capacitor and a switch on the low potential side to ON is determined. A capacitor from which charge is discharged can be previously determined according to a voltage waveform to be applied. In the inkjet printer 10, a voltage waveform for driving the ejection head 24 is previously determined, and a capacitor in which charge is excessively stored is not changed depending on the kind of a voltage waveform. Accordingly, the capacitor from which charge is discharged to ground can be previously fixed irrespective of a voltage waveform.

Figure 19:
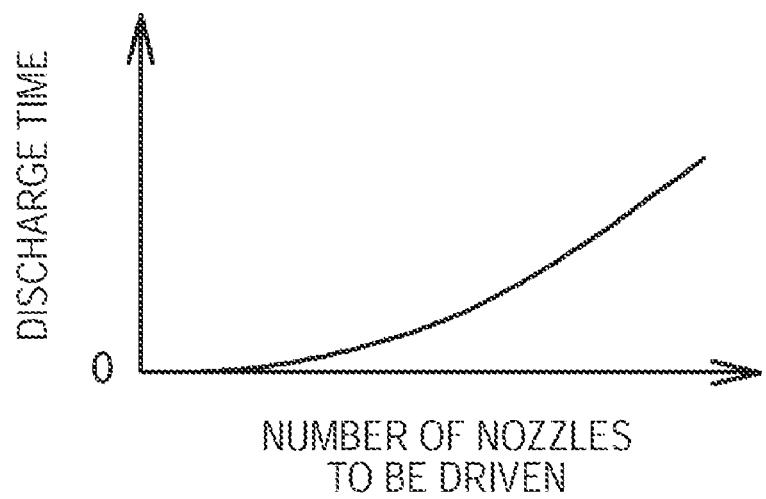
FIG. 19 is a graph showing a discharge time set according to the number of nozzles to be driven.

FIG. 19 is a graph showing a discharge time set according to the number of nozzles to be driven. Similarly to the above-described voltage correction amount, also the discharge time is set so as to increase according to the number of nozzles when the number of nozzles to be driven increases to a certain value or more. In the case where the discharge time is determined in this manner, when the number of nozzles to be driven increases to a certain value or more, only the charge excessively stored in a capacitor can be earthed to ground to maintain a voltage across the terminals of the capacitor in a proper voltage range.

Also a table shown in FIG. 19 is stored in the ROM mounted on the printer control circuit 50. At step S106 in FIG. 17, the CPU of the printer control circuit 50 performs a process of determining the discharge time corresponding to the number of nozzles to be driven with reference to the table.

After the voltage correction amount and the discharge time corresponding to the number of nozzles to be driven are determined as described above, a generated voltage of the first power supply Vs or the second power supply Vb is first corrected based on the voltage correction amount. Subsequently, a switching sequence for switching the connections of switches is modified so that charge is discharged from a capacitor to ground for the predetermined discharge time (step S108). In the inkjet printer 10 as described above, since a voltage waveform to be output is previously determined, a capacitor in which charge is excessively stored can be fixed irrespective of the voltage waveform.

After the generated voltage of the first power supply Vs or the second power supply Vb is corrected, and the switching sequence for switches is modified in this manner, the connections of switches are switched according to the modified switching sequence to output a voltage waveform (step S110). Since the completion of switching sequence to the end means the output of one voltage waveform, the process returns to step S100 to determine whether or not it is a new drive start timing.

In the fourth modified example as described above, a voltage to be applied or the discharge amount of charge from a capacitor is corrected according to the magnitude of a capacitive component of an electrical load (the ejection head 24 in this case) to be driven, whereby the load can be driven properly.

While the embodiment and first to fourth modified examples have been described, the invention is not limited the embodiment and modified examples. The invention can be implemented in various aspects within a range not departing from the gist thereof. For example, although a capacitive load to be driven has been described as the piezo element 104, any load is applicable without limiting to the piezo element 104 as long as it has a capacitive component. For example, even when display devices such as liquid crystal panels or organic EL display devices are driven as loads, the invention can be suitably applied. Moreover, in a fluid ejection device as a surgical instrument for incision or excision of living tissues by ejecting liquid such as water or saline solution in pulses, the invention can be applied to a pulsating flow generating device that drives a piezo element to change the volume of a liquid chamber, thereby converting liquid into pulse-like pulsating flow.

What is claimed is:

1. A capacitive load driving circuit that drives an electrical load having a capacitive component, comprising:
    a first power supply that generates a first voltage;
    a second power supply that generates a second voltage different from the first voltage;
    a plurality of charge storage elements charged by the first power supply;
    a first connection unit that connects the plurality of charge storage elements to the electrical load by switching connections among the charge storage elements; and
    a second connection unit that connects the second power supply to the electrical load,
    wherein the first connection unit and the second connection unit comprise a series of switches which selectively connect the charge storage elements and the second power supply to the electrical load.

2. The capacitive load driving circuit according to claim 1, further comprising
    an auxiliary charge storage element that is a charge storage element charged by the second power supply, and
    a current limiting unit that limits current flowing from the second power supply toward the auxiliary charge storage element is disposed between the second power supply and the auxiliary charge storage element.

3. The capacitive load driving circuit according to claim 2, wherein
    the current limiting unit includes at least one of a resistance, a switch, and a diode.

4. The capacitive load driving circuit according to claim 1, wherein,
    the electrical load is a load in which a magnitude of a capacitive component varies, and
    at least one of the first power supply and the second power supply is a power supply that generates a voltage that varies according to the magnitude of a capacitive component of the electrical load.

5. The capacitive load driving circuit according to claim 1, further comprising a charge discharging unit that discharges charge from a charge storage element whose stored voltage reaches a predetermined voltage higher than the first voltage, among the plurality of charge storage elements.

6. The capacitive load driving circuit according to claim 5, wherein,
    the electrical load is a load in which the magnitude of a capacitive component varies, and
    the charge discharging unit is a unit that discharges charge from the charge storage element for a time according to the magnitude of a capacitive component of the electrical load.

7. A capacitive load driving circuit that drives an electrical load having a capacitive component, comprising:
    a first power supply that generates a first voltage;
    a second power supply that generates a second voltage larger than the first voltage;
    a charge storage element charged by the first power supply;
    a first connection unit that connects the charge storage element to the electrical load; and
    a second connection unit that connects the second power supply alone, or with the charge storage element connected in series thereto, to the electrical load,
    wherein the first connection unit and the second connection unit comprise a series of switches which selectively connect the charge storage elements and the second power supply to the electrical load.

8. A liquid ejection device comprising:
    the capacitive load driving circuit according to claim 1; and
    an ejection nozzle connected to and driven by the capacitive load driving circuit as the electrical load to eject liquid.

* * * * *